United States Patent
Maeda

(10) Patent No.: US 11,282,230 B2
(45) Date of Patent: Mar. 22, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Keisuke Maeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 16/760,122

(22) PCT Filed: Sep. 12, 2018

(86) PCT No.: PCT/JP2018/033801
§ 371 (c)(1),
(2) Date: Apr. 29, 2020

(87) PCT Pub. No.: WO2019/087581
PCT Pub. Date: May 9, 2019

(65) Prior Publication Data
US 2020/0258253 A1 Aug. 13, 2020

(30) Foreign Application Priority Data
Nov. 6, 2017 (JP) .............................. JP2017-213593

(51) Int. Cl.
*G06T 7/73* (2017.01)

(52) U.S. Cl.
CPC ...... *G06T 7/74* (2017.01); *G06T 2207/30244* (2013.01)

(58) Field of Classification Search
CPC .. G06K 9/6203; G06K 9/6206; G06K 9/6209; G06T 7/30; G06T 7/33;
(Continued)

(56) References Cited

U.S. PATENT DOCUMENTS

2013/0201201 A1* 8/2013 Morinaga et al. ...... G06T 5/008
345/589
2014/0015813 A1* 1/2014 Numaguchi et al. ... G06T 17/00
345/184
(Continued)

FOREIGN PATENT DOCUMENTS

JP 2005-033319 A 2/2005 ............. H04N 5/232
JP 2007-072665 A 3/2007 ............... G06T 7/00
(Continued)

OTHER PUBLICATIONS

Liu et al., A completely affine invariant image-matching method based on perspective projection, Machine Vision and Applications, Jun. 2, 2011, pp. 231-242.

*Primary Examiner* — Andrew W Johns
(74) *Attorney, Agent, or Firm* — Paratus Law Group, PLLC

(57) ABSTRACT

An imaging unit acquires object information (e.g., captured image) representing a target object. A distance measurement unit measures the distance to the target object. An object detection unit detects the target object from the captured image. An object position detection unit detects the position of the target object on the basis of, for example, the position, in a captured image, of the target object, the distance to the target object, and parameter information stored in an information storage unit. An appearance information generation unit compares appearance information representing the appearance of an object model at the position of the target object from the information acquisition position where the object information has been acquired with the target object generated and detected for each object model by using the position of the target object and parameter information related to the acquisition of the object information, and identifies the object model corresponding to the appearance
(Continued)

40 information that matches the target object as a target object. An object can be identified with high precision by using the appearance information.

14 Claims, 22 Drawing Sheets

(58) Field of Classification Search
CPC .. G06T 7/344; G06T 7/70; G06T 7/74; G06T 19/00; G06T 2207/30244
See application file for complete search history.

(56) References Cited

U.S. PATENT DOCUMENTS

| | | | |
|---|---|---|---|
| 2017/0228878 A1* | 8/2017 | Goldman et al. | G06T 7/344 |
| 2018/0165831 A1* | 6/2018 | Kwant et al. | G05D 1/0251 |
| 2019/0228263 A1* | 7/2019 | Szeto et al. | G06K 9/00671 |

FOREIGN PATENT DOCUMENTS

| | | | |
|---|---|---|---|
| JP | 2016-136320 A | 7/2016 | G06T 7/00 |
| WO | WO 2013/008584 A1 | 1/2013 | G06T 19/00 |

* cited by examiner

FIG. 5
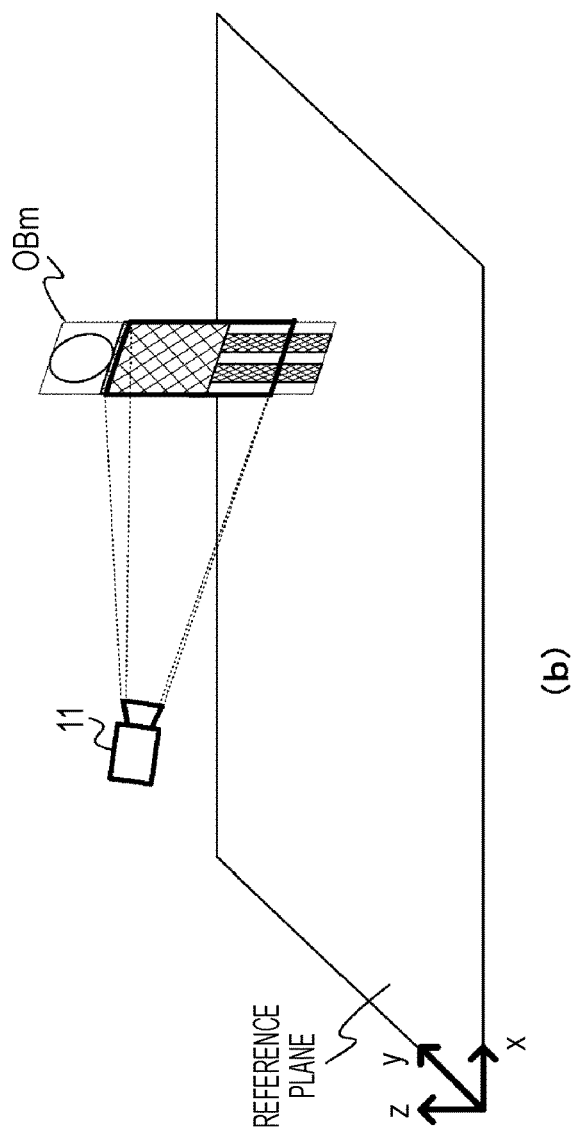
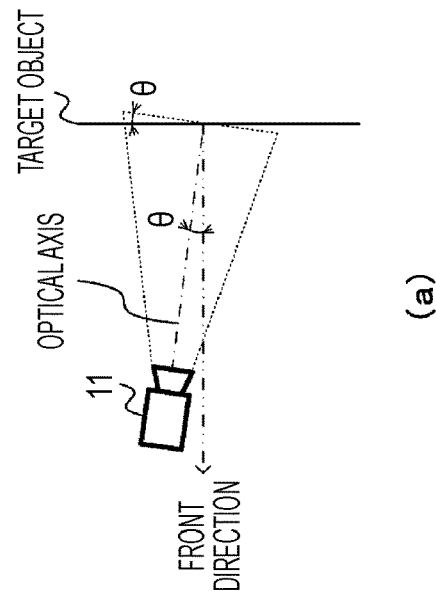
(a)
(b)

FIG. 11
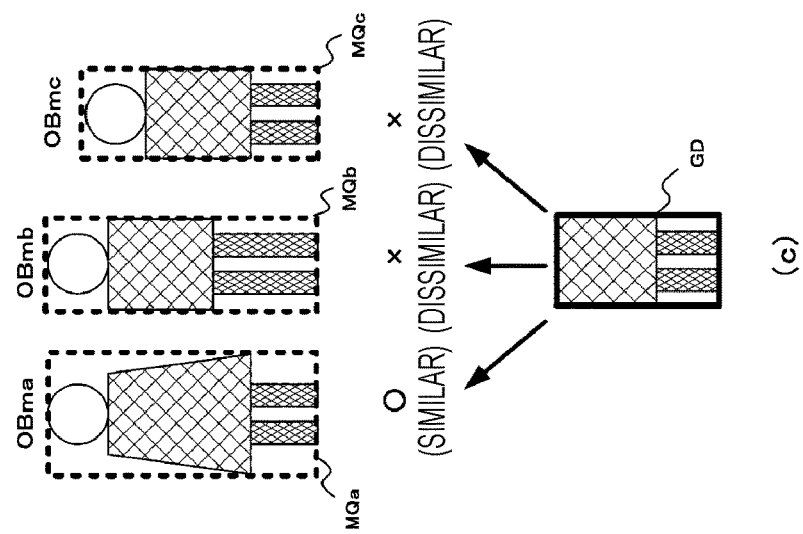
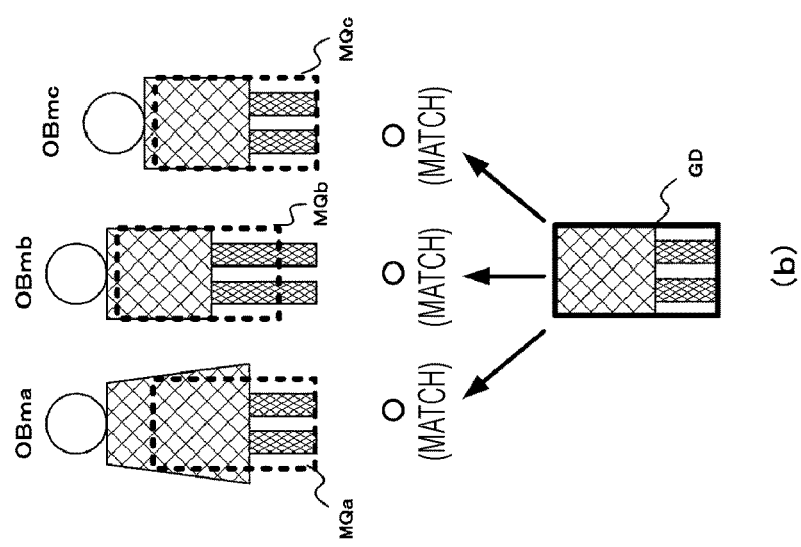
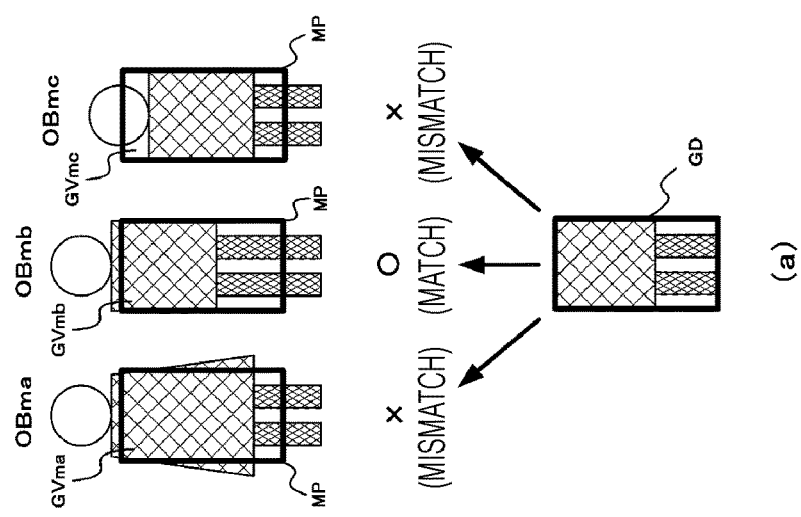

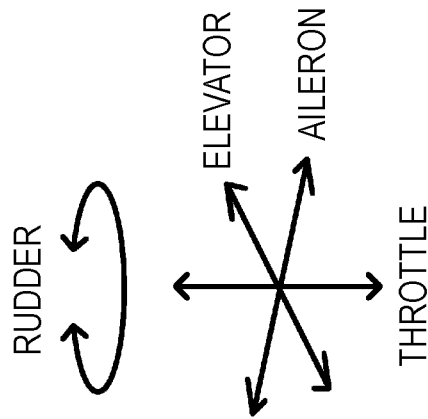
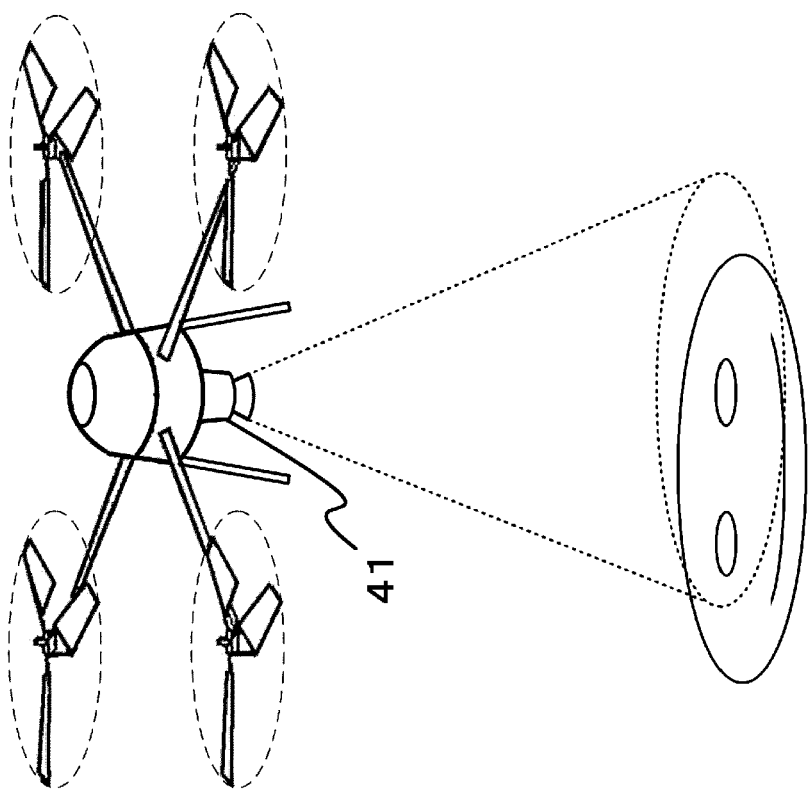
FIG. 17

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/033801 (filed on Sep. 12, 2018) under 35 U.S.C. § 371, which claims priority to Japanese Patent Application No. 2017-213593 (filed on Nov. 6, 2017), which are all hereby incorporated by reference in their entirety.

TECHNICAL FIELD

The technology relates to an information processing apparatus, an information processing method, and a program, and enables identification of an object with high precision.

BACKGROUND ART

Conventionally, in object identification, a combination of input data and output label is learned, and a label is predicted for new input data. For example, in Patent Document 1, a plurality of templates is prepared in accordance with the distance to a target object, and the templates are switched in accordance with a position in an image. In such a way, recognition precision is improved. Furthermore, Cited Document 2 illustrates that the position and posture of a target object are used for narrowing down templates.

CITATION LIST

Patent Document

Patent Document 1: Japanese Patent Application Laid-Open No. 2007-072665
Patent Document 2: Japanese Patent Application Laid-Open No. 2016-136320

SUMMARY OF THE INVENTION

Problems to be Solved by the Invention

By the way, in object identification, prediction precision is more stable for data similar to that at the time of learning, and erroneous prediction is highly likely to be performed in data that is not similar to that at the time of learning. For example, in a case of identifying a person from an image, if a close-up picture is given to a discriminator that has learned by using a full-body picture, a reflected person is highly likely to be incorrectly predicted. Furthermore, in a case where a plurality of templates is prepared in accordance with the distances to a target object, if a distance is incorrectly estimated due to changes in the position or posture of a sensor of, for example, a moving object, the templates are not optimally switched. Furthermore, in a case where the templates are narrowed down on the basis of the position and posture of the target object, different appearances reduce identification precision. For example, erroneous recognition increases in a captured image in which a template does not match an appearance, for example, a target object is parted, and the entire image is not reflected. Furthermore, in order to be robust against the appearance, templates for various appearances are required to be prepared.

Then, an object of the technology is to provide an information processing apparatus, an information processing method, and a program capable of identifying an object with high precision.

Solutions to Problems

A first aspect of the technology is directed to an information processing apparatus including an appearance information generation unit that generates appearance information representing appearance of an object model at a position of a target object from an information acquisition position where object information has been acquired on the basis of position information indicating a position of the target object and parameter information related to acquisition of the object information representing the target object.

In the technology, the appearance information generation unit generates appearance information on the basis of the position information indicating the position of the target object and the parameter information related to the acquisition of the object information representing the target object. The appearance information represents the appearance of the object model at the position of the target object from the information acquisition position where the object information has been acquired. For example, the appearance information generation unit performs perspective projection conversion on a region where a view-field region of a sensor unit that acquires object information and the object model overlap, and generates appearance information indicating the appearance of the object model. The appearance information generation unit determines the view-field region on the basis of the position and posture of the sensor unit and the parameter information. Furthermore, the appearance information generation unit excludes a region of a non-target object from the appearance information. The non-target object is contained in an overlapping region of the view-field region and the object model, and positioned in front of the target object. The position of the target object is detected on the basis of the position of the target object in the captured image of the target object indicated by object information, the distance from the information acquisition position of the object information to the target object, and parameter information. Furthermore, the position of the target object may be detected as the position of a cluster, which has been detected by clustering point group data in accordance with a distance measurement value. The point group data indicates the distance measurement value to the target object indicated by the object information. Moreover, the object identification unit identifies the target object by using the appearance information for each object model generated by the appearance information generation unit.

Furthermore, a sensor unit for acquiring object information is provided in a flying object. Position information indicating the position of the target object contains the posture of the sensor unit with respect to a reference plane such as, for example, a ground on which the object model is placed. Moreover, a position calculation unit is provided. The position calculation unit calculates the position of the sensor unit on the basis of the position information of the object model, the appearance information that matches the target object, and the posture of the sensor unit. Furthermore, in a case where a posture change amount in a roll direction of the sensor unit cannot be acquired, the object model is provided for each of postures different in the roll direction.

A second aspect of the technology is directed to an information processing method including generating appearance information representing appearance of an object model at a position of a target object from an information acquisition position where object information has been acquired on the basis of position information indicating a position of the target object and parameter information related to acquisition of the object information representing the target object.

A third aspect of the technology is directed to a program causing a computer to execute information processing related to a target object, the program causing the computer to execute a procedure of generating appearance information representing appearance of an object model at a position of the target object from an information acquisition position where object information has been acquired on the basis of position information indicating a position of the target object and parameter information related to acquisition of the object information representing the target object.

Note that the program of the present, technology can be provided to a general-purpose computer capable of executing various program codes by a storage medium provided in a computer-readable format, a communication medium, a storage medium such as, for example, an optical disk, a magnetic disk, and a semiconductor memory, and a communication medium such as a network. Processing in accordance with a program is performed on a computer by providing such a program in a computer-readable format.

Effects of the Invention

According to the technology, appearance information is generated on the basis of position information indicating the position or a target object and parameter information related to the acquisition of object information representing the target object. The appearance information represents the appearance of the object model at the position of the target object from the information acquisition position where the object information has been acquired. Consequently, the identification precision of the target object can be improved by comparing the information of the target object acquired from the information acquisition position with the appearance information. Note that the effects described in the specification are merely illustration and not limitation, and additional effects may be exhibited.

BRIEF DESCRIPTION OF DRAWINGS

FIG. 5 illustrates the appearance of an object model.

FIG. 11 illustrates appearance information of a plurality of object models.
FIG. 17 illustrates a case where a sensor unit is provided downward with respect to an unmanned flying object.

MODE FOR CARRYING OUT THE INVENTION

An embodiment for carrying out the present technology will be described below. Note that the description will be given in the following order.
1. First Configuration of System.
2. First Operation of First Configuration
3. Second Operation of First Configuration
4. Second Configuration of System
5. Operation of Second Configuration
6. Other Operations of System <1. First Configuration of System>

Figure 1:
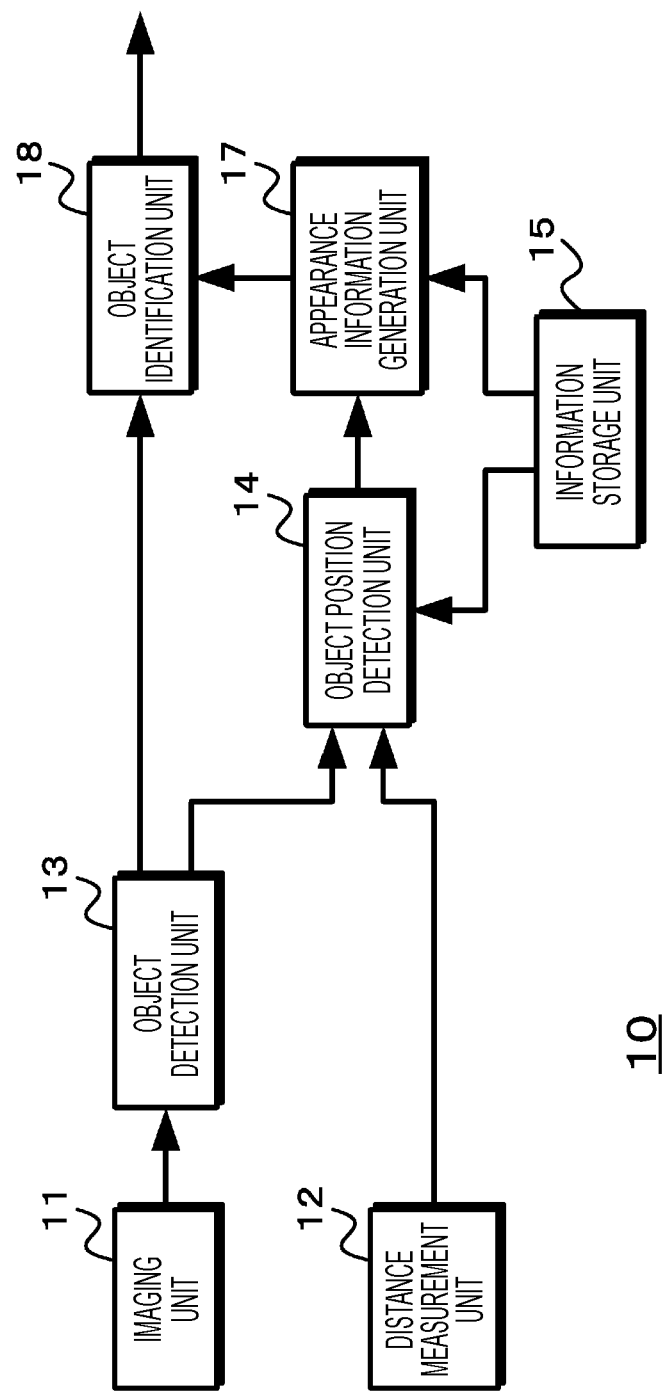
FIG. 1 illustrates a first configuration of a system.

FIG. 1 illustrates a first configuration of a system using an information processing apparatus of the present technology. The system in FIG. 1 is a moving object mounted with various sensors, for example, a robot including an imaging unit and a distance measurement unit. A system 10 includes an imaging unit 11, a distance measurement unit 12, an object detection unit 13, an object position detection unit 14, an information storage unit 15, an appearance information generation unit 17, and an object identification unit 18.

The imaging unit 11 acquires object information representing a target object. The object information indicates an outside feature that can be acquired by observing the target object from the outside, and indicates, for example, the shape, luminance, color, temperature, and the like of the target object. Examples of the imaging unit 11 include a color camera, a monochrome camera, an infrared camera, and the like. A captured image of three primary colors can be obtained by the color camera. A monochrome captured image can be obtained by the monochrome camera. A temperature image indicating the temperature of a target object can be obtained by the infrared camera. Note that parameter information at the time when the imaging unit 11 acquires object information representing the target object and a parameters (also referred to as a sensor parameter) is stored in the later-described information storage unit 15. The parameter includes, for example, the position and posture of the imaging unit 11, and the viewing angle and focal length of the imaging unit 11. The position of the imaging unit 11 is an information acquisition position where the object information is acquired.

The distance measurement unit 12 is a sensor for measuring the distance to a target object. Examples of the distance measurement unit 12 include a stereo camera, a camera capable of acquiring a captured image and distance measurement information with an image sensor including an image surface phase difference pixel, a time of flight (TOF) sensor, light detection and ranging, laser imaging detection and ranging (LIDAR), radio detection and ranging (RADAR), and the like.

The object detection unit 13 detects the presence of a target object on the basis of a captured image acquired by the imaging unit 11, and outputs the position of the detected target object in the image.

The object position detection unit 14 detects the three-dimensional position of the target object on the basis of, for example, the position, in a captured image, of the target object detected by the object detection unit 13, the distance to the target object measured by the distance measurement unit 12, and parameter information stored in the information storage unit 15. The object position detection unit 14 outputs position information indicating the detected position to the appearance information generation unit 17.

The information storage unit 15 stores parameter information related to acquisition of object information representing the target object. The parameter information stores, for example, the position and posture of the imaging unit 11, and sensor parameters. Furthermore, the information storage unit 15 stores object model information representing a learned object model.

The appearance information generation unit 17 uses the position information indicating the position of the target object and the parameter information related to the acquisition of the object information representing the target object to generate appearance information for each object model. The appearance information represents the appearance of the object model at the position of the target object from the information acquisition position where the object information has been acquired. The appearance information generation unit 17 defines the part of the object model that overlaps the view-field region of the imaging unit 11 as the appearance of the object model. The imaging unit 11 acquires object information. Furthermore, the appearance information generation unit 17 determines the part of the object model that overlaps the view-field region on the basis of the position and posture of the imaging unit 11 and sensor parameters.

The object identification unit 18 compares the appearance information for each object model generated by the appearance information generation unit 17 with the target object detected by the object detection unit 13, identifies the object model corresponding to the appearance information that matches the detected target object as the target object, and outputs the object identification result.

<2. First Operation of First Configuration>

Figure 2:
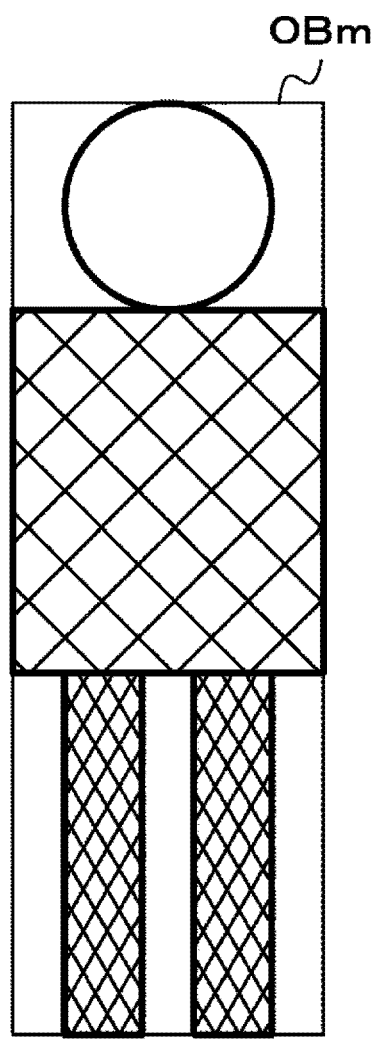
FIG. 2 illustrates an object model.

Next, a first operation of the first configuration of the system will be described. Note that FIG. 2 illustrates an object model, and an object model OBm is assumed to be a "two-dimensional image having a size". Furthermore, the imaging unit 11 acquires a captured image of a target object as object information.

The appearance information generation unit 17 places the imaging unit 11 and an object model on a reference plane on the basis of the position information of the detected target object and the position and posture of the imaging unit 11. For example, the object model is placed at the position of the target object so as to be perpendicular to the reference plane and to face the imaging unit 11. In this case, any coordinate system may be used as long as the coordinate systems are unified.

Figure 3:
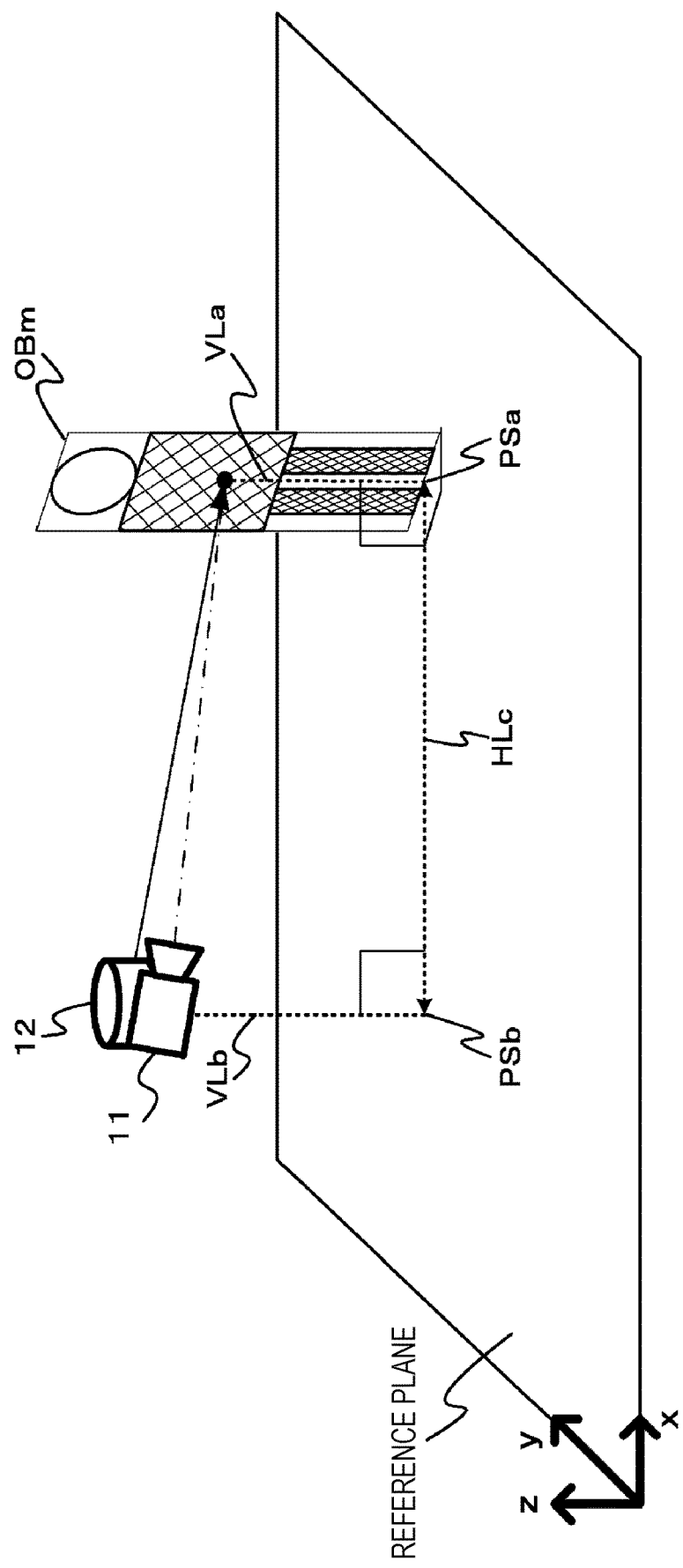
FIG. 3 illustrates the case where an imaging unit and an object model are placed with reference to the coordinate system of a reference plane.

FIG. 3 illustrates the case where an imaging unit and an object model are placed with reference to the coordinate system of the reference plane. The appearance information generation unit 17 determines a perpendicular line VLa that passes through a three-dimensional position of the object model and that has a foot on the reference plane. Note that the intersection of the perpendicular line VLa and the reference plane is defined as a standing position PSa. Next, the appearance information generation unit 17 determines a perpendicular line VLb that passes through a reference point of the imaging unit 11 and that has a foot on the reference plane. Note that the intersection of the perpendicular line VLb and the reference plane is defined as a standing position PSb. Moreover, a line segment HLc connecting the standing positions PSa and PSb is determined. The object model OBm is placed on a plane that contains the perpendicular line VLa and that is perpendicular to the line segment HLc such that the bottom of the object model is put on the reference plane.

Figure 4:
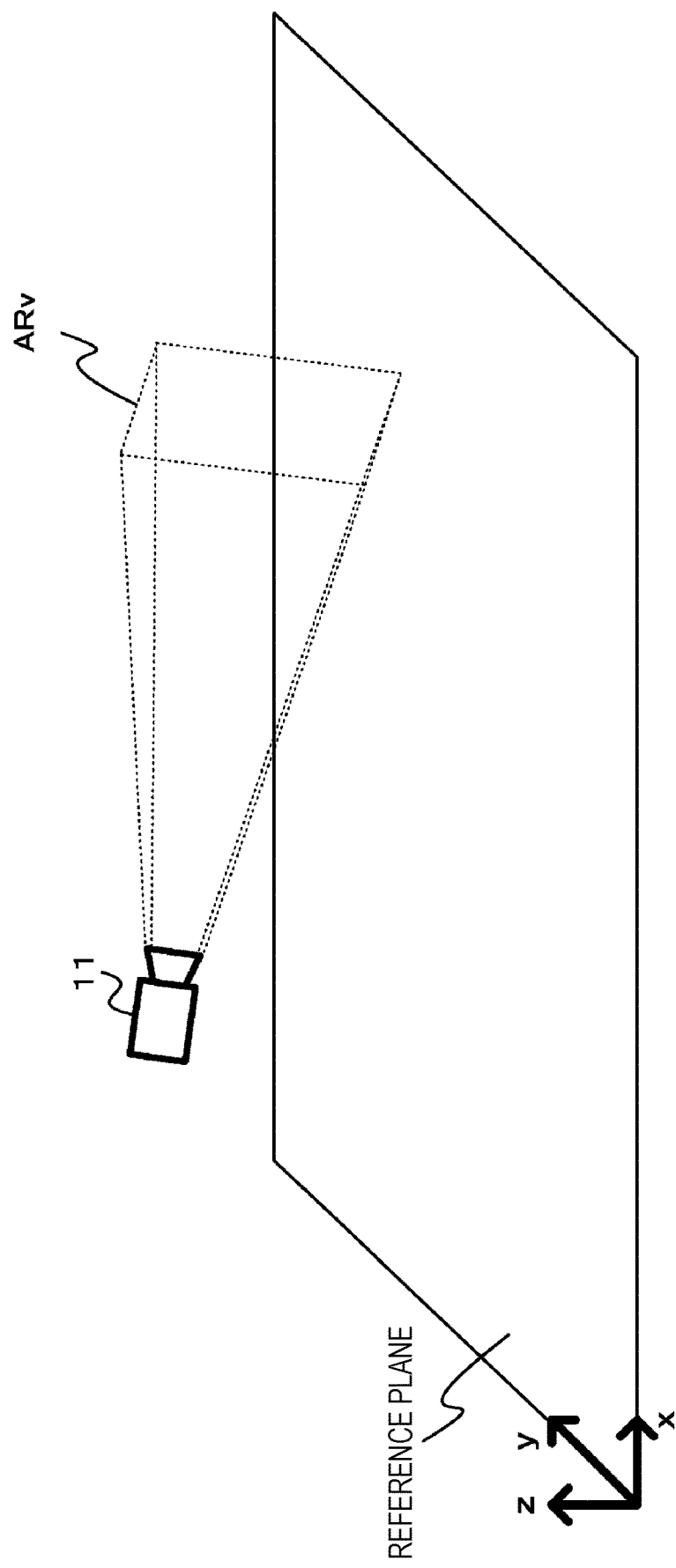
FIG. 4 illustrates a three-dimensional figure representing a view-field region of the imaging unit determined with reference to the coordinate system of the reference plane.

Furthermore, the appearance information generation unit 17 determines a view-field region of the imaging unit 11 in three-dimensional space, for example, a three-dimensional figure representing the view-field region of the imaging unit 11 on the basis of the position and posture of the imaging unit 11 and parameter information. In a common imaging unit, the view-field region is within a quadrangular pyramid with the camera position being defined as a vertex. FIG. 4 illustrates a three-dimensional figure representing a view-field region of the imaging unit determined with reference to the coordinate system of the reference plane. The appearance information generation unit 17 determines a three-dimensional quadrangular pyramid representing a view-field region ARv on the basis of the position and posture of the imaging unit 11 in the coordinate system of the reference plane and horizontal and perpendicular view angles.

Figure 6:
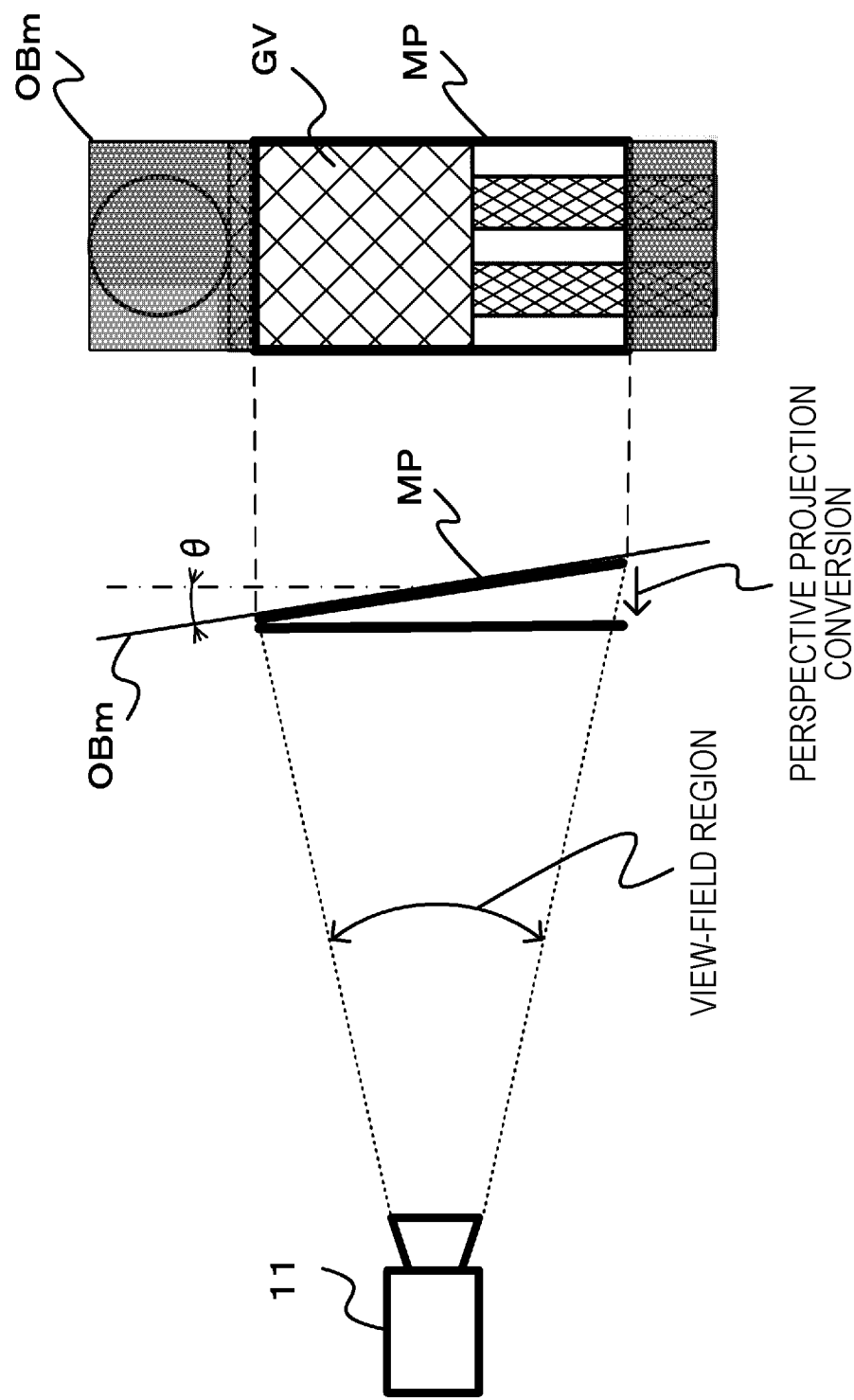
FIG. 6 illustrates appearance information.

Next, the appearance information generation unit 17 generates appearance information from the object model on the basis of the overlap between the object model OBm placed on the reference plane and the quadrangular pyramid indicating the view-field region. FIG. 5 illustrates the appearance of the object model. As illustrated in (a) of FIG. 5, in a case where the inclination θ is generated between the optical axis of the imaging unit 11 and the front direction of the object model OBm, the object model Ohm has a posture inclined with respect to the imaging unit 11. Consequently, as illustrated in (b) of FIG. 5, a region contained in the quadrangular pyramid indicating the viewfield region of the imaging unit 11 corresponds to the appearance of the object model in the object model OBm having the inclination θ with respect to the imaging unit 11, that is, the object model OBm having a posture in accordance with the positional relation between the imaging unit 11 and the target object. For this reason, as illustrated in FIG. 6, the appearance information is obtained by converting a region MP that is different from the view-field region into the coordinate system of the imaging unit by transmission projection conversion and indicates an image GV in the object model OBm in the posture having the inclination θ with respect to the imaging unit 11. Note that, in a case where the optical axis of the imaging unit 11 is in the direction vertical to the surface of the object model OBm, the overlapping part has a rectangular shape, and in a case where the optical axis is not in the direction vertical to the surface of the object model OBm, the overlapping part has a quadrangular shape different from the rectangular shape.

Figure 7:
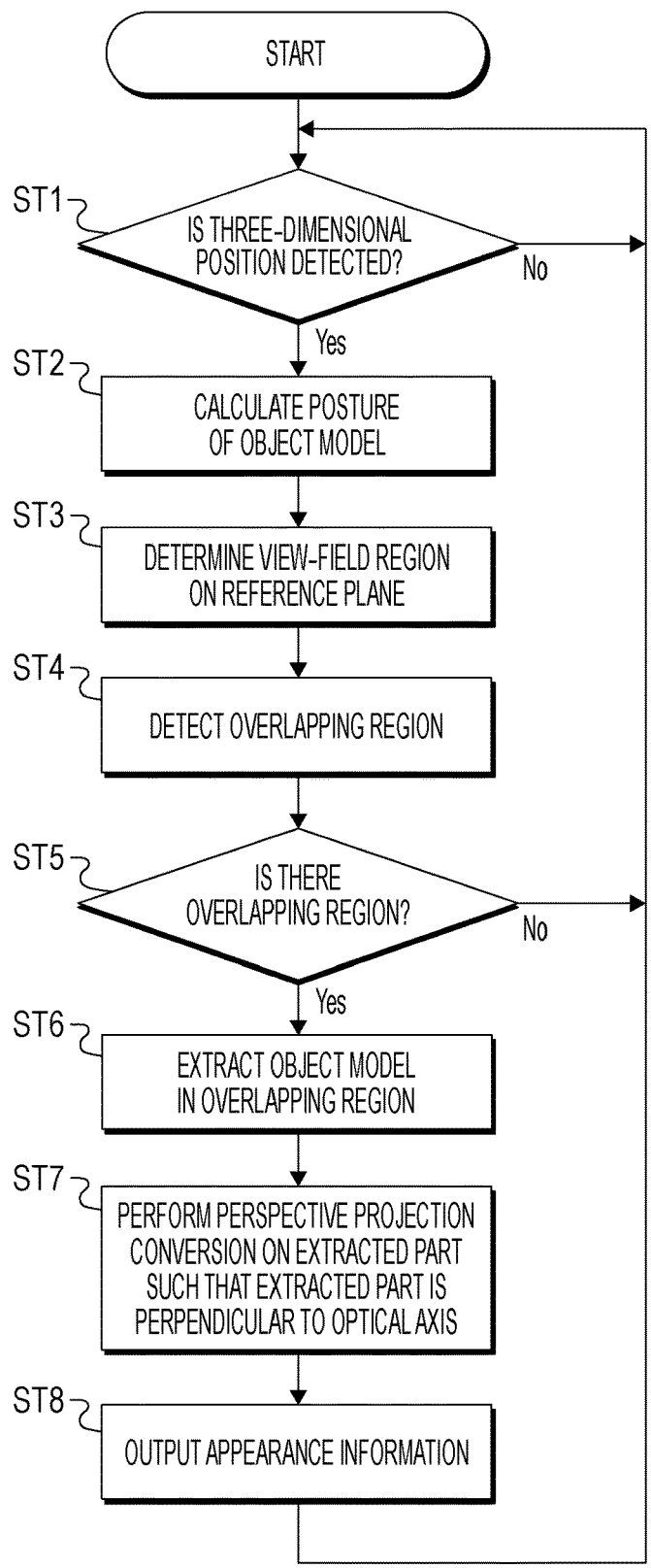
FIG. 7 is a flowchart illustrating the operation of an appearance information generation unit.

FIG. 7 is a flowchart illustrating the operation of the appearance information generation unit. In Step ST1, the appearance information generation unit determines whether or not the three-dimensional position of a target object is detected. In a case where the object position detection unit 14 does not detect the three-dimensional position of the target object, the appearance information generation unit 17 returns to Step ST1, and otherwise, the appearance information generation unit 17 proceeds to Step ST2.

Figure 8:
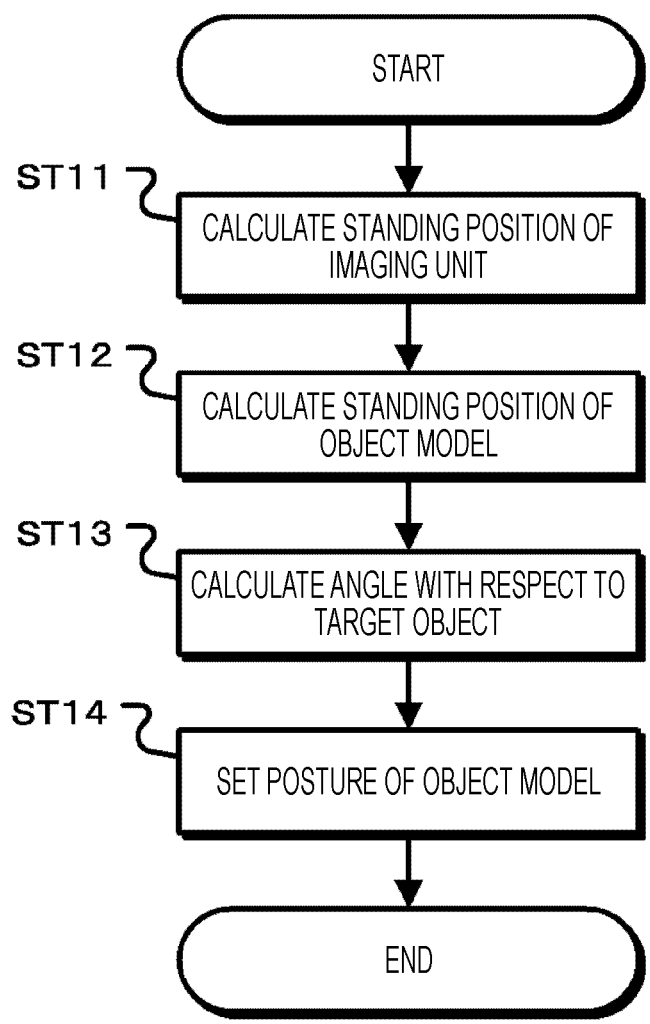
FIG. 8 is a flowchart illustrating the operation of calculating a posture.

In Step ST2, the appearance information generation unit calculates the posture of an object model. The appearance information generation unit 17 calculates the posture of the object model on a reference plane. FIG. 8 is a flowchart illustrating the operation of calculating a posture.

In Step ST11, the appearance information generation unit calculates the standing position of an imaging unit. As described above, the appearance information generation unit 17 defines the position where the coordinate value of the perpendicular line VLb in a Z direction is "0" as the standing position PSb of the imaging unit 11, and proceeds to Step ST12. The perpendicular line VLb passes through a reference point of the imaging unit 11, and has a foot on a reference plane.

Figure 9:
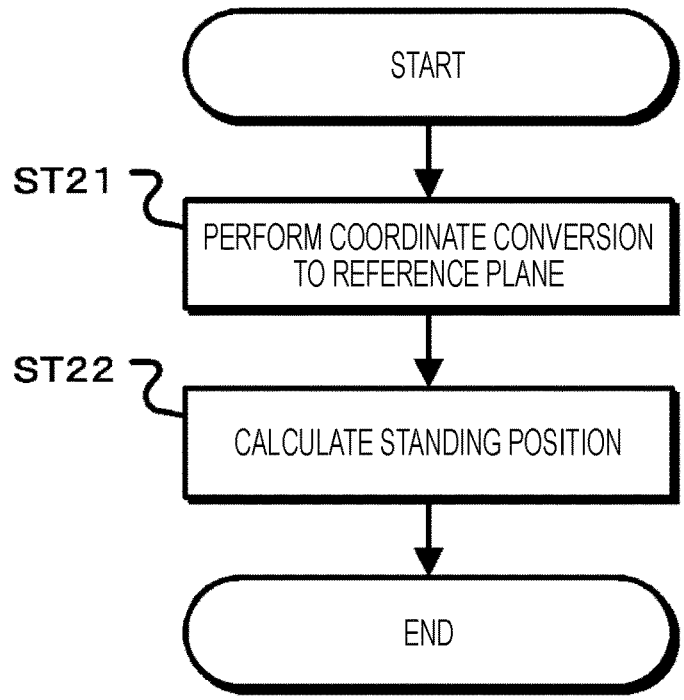
FIG. 9 is a flowchart illustrating the operation of calculating a standing position of an object model.

In Step ST12, the appearance information generation unit calculates the standing posit on of an object model. FIG. 9 is a flowchart illustrating the operation of calculating the standing position of an object model. In Step ST21, the appearance information generation unit performs coordinate conversion to the reference plane. The appearance information generation unit 17 converts the object model into the coordinates of the reference plane, and proceeds to Step ST22.

In Step ST22, the appearance information generation unit calculates the standing position. The appearance information generation unit 17 defines the position, where the coordinate value in the Z direction is "0" at the time when the three-dimensional position of the target object detected by the object position detection unit 14 is subject to coordinate conversion to the reference plane, as the standing position PSa of the object model OBm after the coordinate conversion, and proceeds to Step ST13 in FIG. 8.

Figure 10:
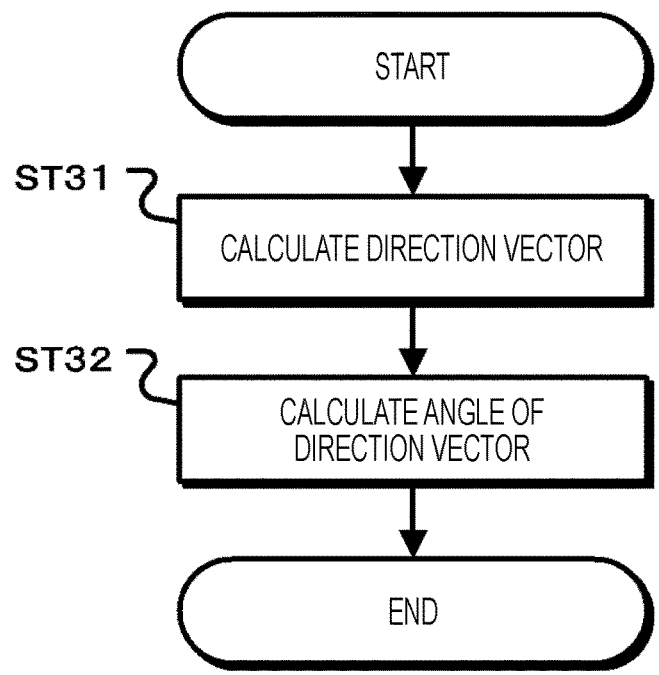
FIG. 10 is a flowchart illustrating the operation of calculating an angle.

In Step ST13, the appearance information generation unit calculates the angle generated by the imaging unit and the target object. FIG. 10 is a flowchart illustrating the operation of calculating the angle. In Step ST31, the appearance information generation unit calculates a direction vector. The appearance information generation unit 17 calculates a direction vector indicating the difference between the standing position PSa of the object model OBm and the standing position PSb of the imaging unit 11, and proceeds to Step ST32.

In Step ST32, the appearance information generation unit calculates the angle of the direction vector. The appearance information generation unit 17 calculates the angle between a straight line connecting the imaging unit 11 and the optical-axis position of the imaging unit 11 in the target object and the reference plane in the direction vector calculated in Step ST31. Specifically, the appearance information generation unit 17 calculates the difference between the position (height) of the imaging unit 11 indicated by template information in the standing position PSb and the height of the optical-axis position of the imaging unit 11 calculated on the basis of, for example, the position and posture of the imaging unit 11 in the target object of the standing position PSa. Furthermore, the appearance information generation unit 17 defines the arc tangent calculated by using the calculated difference between heights and the norm of the direction vector calculated in Step 131 as the angle (inclination) θ of the direction vector, and proceeds to Step ST14 in FIG. 8.

In Step ST14, the appearance information generation unit sets the posture of the object model. The appearance information generation unit 17 sets the object model OBm to the posture having the inclination θ, calculated in Step ST13, with respect to the imaging unit 11, and proceeds to Step ST4 in FIG. 7. Note that the posture having the inclination θ is illustrated in the state in FIG. 5.

In Step ST4, the appearance information generation unit detects an overlapping region of a view-field region and the object model in the set posture. The appearance information generation unit 17 detects the overlapping region where the object model and the view-field region overlap on the basis of the posture of the object model OBm with respect to the imaging unit 11 and the view-field region of the imaging unit 11, and proceeds to Step ST5.

In Step ST5, the appearance information generation unit determines whether or not there is an overlapping region. The appearance information generation unit 17 proceeds to Step ST6 in a case where there is the overlapping region, and returns to Step ST1 in a case where there is no overlapping region.

In Step ST6, the appearance information generation unit extracts an object model in the overlapping region. The appearance information generation unit 17 extracts the overlapping region detected in Step ST4 as an object model, and proceeds to Step ST7.

In Step ST7, the appearance information generation unit performs perspective projection conversion such that the extracted part is perpendicular to the optical axis. The appearance information generation unit 17 performs perspective projection conversion such that the object model that has been extracted in Step ST6 is perpendicular to the optical axis of the imaging unit 11, defines information indicating the object model that has been converted to the coordinate system of the imaging unit 11 as appearance information, and proceeds to Step ST8.

In Step ST8, the appearance information generation unit outputs the appearance information. The appearance information generation unit 17 outputs an image of an overlapping region in the object model coordinates that has been determined by the coordinate conversion in Step ST6 to the object identification unit 18 as appearance information.

Note that any processing of Steps ST2 and ST3 in FIG. 7 may be performed first, or Steps ST2 and ST3 may be performed in parallel. Furthermore, the similar thing is applied to the processing in Steps ST11 and ST12 in FIG. 8.

FIG. 11 illustrates appearance information of a plurality of object models. According to the first operation of the present technology, as illustrated in (a) of FIG. 11, for example, an image indicating the region MP is generated as appearance information for an object model OBma. Similarly, an image indicating the region MP is generated as appearance information also for the object models OBmb and OBmc. The appearance information differs for each object model. Consequently, the fact that the detected target object is an object model OBmb can be correctly identified by comparing an input image GD with the appearance information. The input image GD represents the target object that has been detected by the object detection unit 13. Note that (b) of FIG. 11 illustrates a case where a traditional technique is used. Regions indicated by broken lines in the object models OBma, OBmb, and OBmc are analogous to the input image GD representing the detected target object. For this reason, the case where the detected object is determined as the object model OBma or OBmc occurs, and highly precise identification processing as in the present technology cannot be performed. Furthermore, in a case where the identification processing is performed by using the entire object model as illustrated in (c) of FIG. 11, the object model OBma whose entire image is similar to the input image GD is easily selected, and highly precise identification processing as in the present technology cannot be performed.

According to the first operation of the present technology, the appearance information of an object model is generated in consideration of the appearance in accordance with, for example, the position and posture of the imaging unit. Even if a part of the target object in the acquired captured image is parted, robustness is secured against the parting, and the identification precision of an object can be improved. Furthermore, since the appearance of the object model from the imaging unit is considered, it is possible to prevent an object that looks similar from being misidentified as a target object.

Furthermore, in a case where an image of a parted object is added to learning data in order to increase the detection rate of the parted object, the probability of misidentifying an object that looks similar as a target object is increased. For example, in a case where an image of a person whose head is invisible is learned, a target object may be misidentified as a person in a captured image of a suit of clothes hung on a hanger. According to the present technology, however, an object is identified by using appearance information in accordance with an imaging condition under the imaging condition in which the entire body is captured. Consequently, in a case where a suit of clothes hung on a hanger is imaged under an imaging condition in which the entire body is captured, the possibility of misidentifying the target object as a person can be reduced.

Furthermore, if object information indicating the entire target object is learned, an object can be identified by using the appearance information in accordance with, for example, the position and posture of the imaging unit. There is thus no need to learn various object models in which a part of the target object is parted, and a data amount of learning data can be reduced.

Moreover, the appearance information is generated by using the distance from the imaging unit to the target object, and thus the size of the object model is considered in the appearance information. For example, in a case where the distances from the imaging unit to the target object are equal, the appearance information contains a part of the object model if the object model is large, and the appearance information contains the entire object model if the object model is small. Consequently, even if the appearances are the same in size, the object can be identified in consideration of the size in accordance with the distance from the imaging unit to the target object.

<3. Second Operation of First Configuration>

Next, a second operation of the first configuration of the system will be described. A part of imaging unit 11 itself as well as the target object may be reflected in a captured image acquired by the imaging unit 11. For example, in a case where a view-field region contains a mounting tool or an attachment tool, a part of an attachment instrument is reflected in the captured image. For example, an accessory is mounted in the imaging unit 11 with the mounting tool. The attachment tool such as a rig is mounted in the imaging unit 11 to improve, for example, operability. Furthermore, in a case where the system is applied to an instrument having a movable mechanism, such as, for example, a robot, a movable arm or the like may be reflected in a captured image. Then, the appearance information generation unit 17 generates appearance information in which a self-shape part (part of an attachment instrument, an arm, and the like) is excluded. The self-shape part is a non-target object contained in an overlapping part of the view-field region of the imaging unit 11 and the object model provided at the position of the target object, and positioned in front of the target object.

The appearance information generation unit 17 three-dimensionally places an object model on the basis of the estimated three-dimensional object position, the position and posture of the reference plane, and the position and posture of the imaging unit 11. For example, the object model placed so as to include a three-dimensional object position, be perpendicular to the reference plane, and face the imaging unit 11. In this case, any coordinate system may be used as long as the coordinate systems are unified.

Next, the appearance information generation unit 17 determines a view-field region of the imaging unit 11 in three-dimensional space, for example, a three-dimensional figure representing the view-field region of the imaging unit 11 on the basis of parameter information.

The appearance information generation unit 17 determines the overlap between the view-field region of the imaging unit 11 and the object model in a manner similar to that in the first operation. Furthermore, the appearance information generation unit 17 determines the overlap between the self-shape part and the view-field region. The self-shape is indicated by a combination of, for example, a three-dimensional mesh or a simple figure (e.g., sphere, cylinder, prism, cuboid, cone, and pyramid). The appearance information generation unit 17 determines the overlap between the self-shape part and the view-field region on the basis of the parameter information of the imaging unit 11, the self-shape, and the position of the self-shape part. Note that the overlap between the self-shape part and the view-field region can be determined by defining a region of a subject reflected at a fixed position of a captured image as the self-shape part regardless of the imaged subject, preliminarily storing self-shape region information indicating the self-shape part in the information storage unit 15, and using the self-shape region information.

Moreover, the appearance information generation unit 17 determines the anteroposterior relation between the target object and the self-shape part. The appearance information generation unit 17 determines the anteroposterior relation between the object model that overlaps the view-field region and the self-shape part, and defines a region, obtained by projecting a self-shape part nearer to the imaging unit 11 than the target object on the object model, as an excluded region MR.

Furthermore, in a case where the self-shape part reflected in the captured image is movable, the appearance information generation unit 17 sets the excluded region MR in accordance with the movable state of the self-shape part. For example, the appearance information generation unit 17 determines the overlap between the self-shape part and the view-field region on the basis or self-shape information stored in the information storage unit 15 and a movable control signal supplied from a control unit (not illustrated), and sets the excluded region MR on the basis of the anteroposterior relation between the target object and the self-shape part. Furthermore, a self-shape calculation unit may be provided to calculate the overall shape of the self-shape part to the imaging unit 11 from the movable state (position/posture) of the self-shape part and the self-shape information stored in the information storage unit 15. In this case, the appearance information generation unit 17 determines the overlap between the shape calculated by the self-shape calculation unit and the view-field region, and sets the excluded region MR on the basis of the anteroposterior relation between the target object and the self-shape part.

Thereafter, the appearance information generation unit 17 obtains the appearance information by excluding the image of the excluded region MR corresponding to the self-shape part from an image of the overlapping region of the view-field region and the object model.

Note that, in the second operation, after the processing of Step ST5 in FIG. 7, processing of determining the overlap between the self-shape part and the view-field region and processing of determining the anteroposterior relation between the object model and the self-shape part are performed, and a region of the self-shape part in front of the object model is excluded from the overlapping region. Then, processing after Step ST6 is required to be performed.

Figure 12:
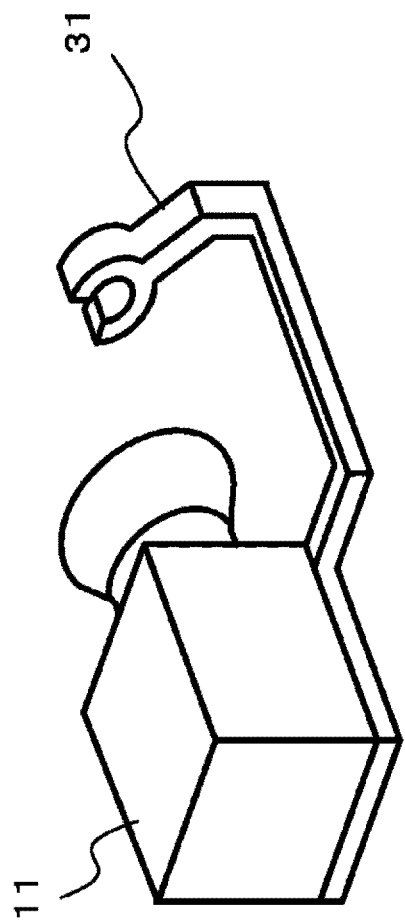
FIG. 12 illustrates a case where a self-part is reflected.

FIG. 12 illustrates a case where a self-part is reflected. For example, if a view-field region contains an attachment tool 31, the attachment instrument is reflected in a captured image. In such a case, according to the second operation, the identification processing can be performed with high precision.

Figure 13:
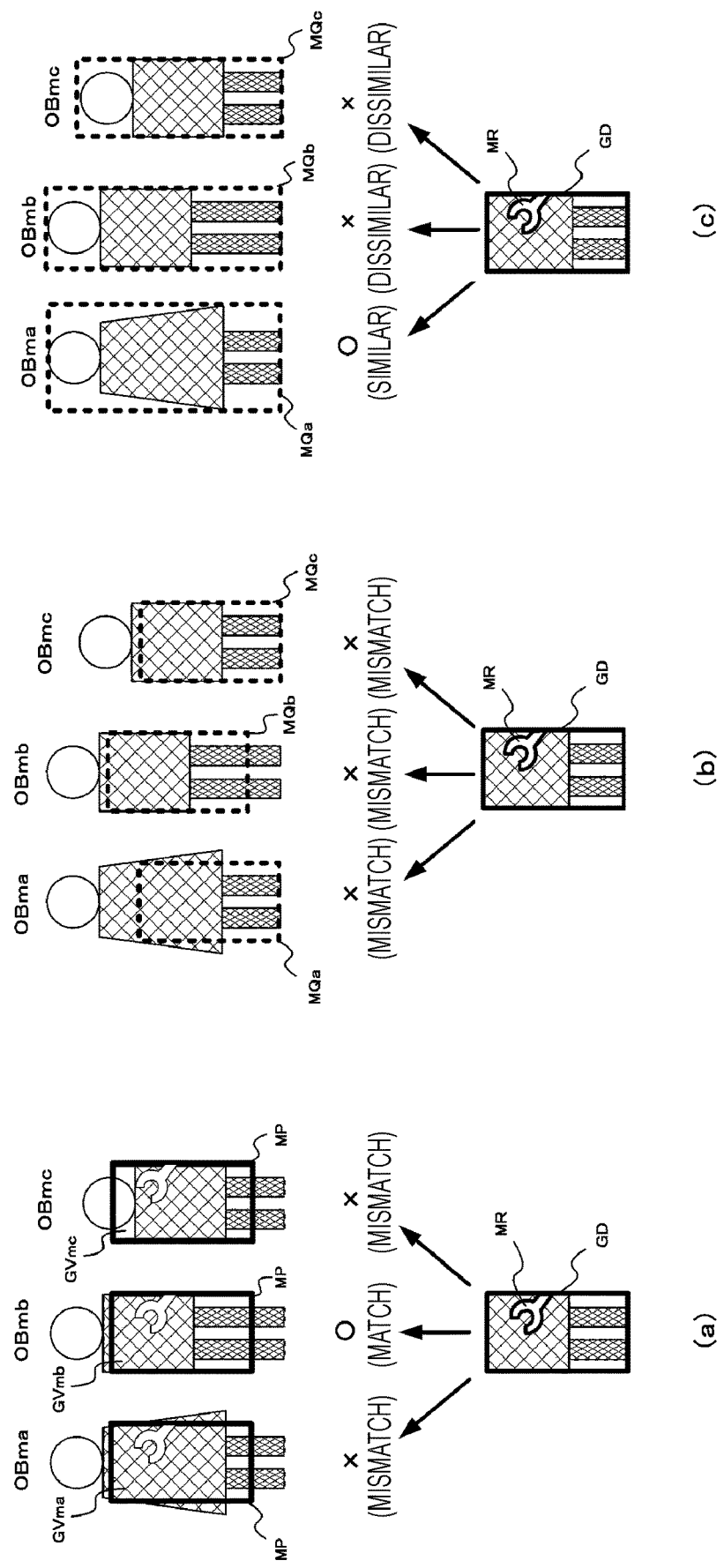
FIG. 13 illustrates appearance information of a plurality of object models.

FIG. 13 illustrates appearance information of a plurality of object models. According to the second operation of the present technology, as illustrated in of FIG. 13, for example, an image GVma of a region obtained by excluding the excluded region MR from the region MP is generated as appearance information for the object model OBma. Similarly, images GVmb and GVmc of regions obtained by excluding the excluded region MR from the region MP are generated as appearance information also for the object models OBmb and OBmc. For this reason, the appearance information differs for each object model, and the self-shape part is excluded from a comparison target. Consequently, the fact that the detected target object is the object model OBmb can be correctly identified by comparing the input image GD with the appearance information. The input image GD represents the object that has been detected by the object detection unit 13. Note that (b) of FIG. 13 illustrates a case where a traditional technique is used. The input image GD containing the excluded region MR, which is a sell-shape part, and the object models OBma, OBmb, and OBmc are compared. A region MQa of the object model OBma, a region MQb of the object model OBmb, and a region MQc of the object model OBmc do not contain the self-shape part, and thus the detected object is determined to be different from the object models OBma, OBmb, and OBmc. Consequently, highly precise identification processing as in the present technology cannot be performed. Furthermore, in a case where the identification processing is performed by using the entire object model as illustrated in (c) of FIG. 13, the object model OBma whose entire image similar to the input image GD is easily selected, and highly precise identification processing as in the present technology cannot be performed.

According to the second operation of the present technology, even if a captured image contains a self-shape part, appearance information is generated by excluding a self-shape part. In a manner similar to that in the first operation, robustness is secured against the parting of a part of the target object, and an object can be identified with high precision. Furthermore, since the appearance from the imaging unit is considered in the appearance information, mis-identification of an object that looks similar as a target object can be reduced. Furthermore, an object can be identified in consideration of reduction and size of a data amount of learning data.

<4. Second Configuration of System>

Next, a second configuration of the system will be described. In the second configuration, a case of acquiring point group distance measurement data as object information by using a distance measurement unit as a sensor unit for acquiring object information will be described. The point group distance measurement data indicates a distance to each position on a target object. The object information represents the target object.

Figure 14:
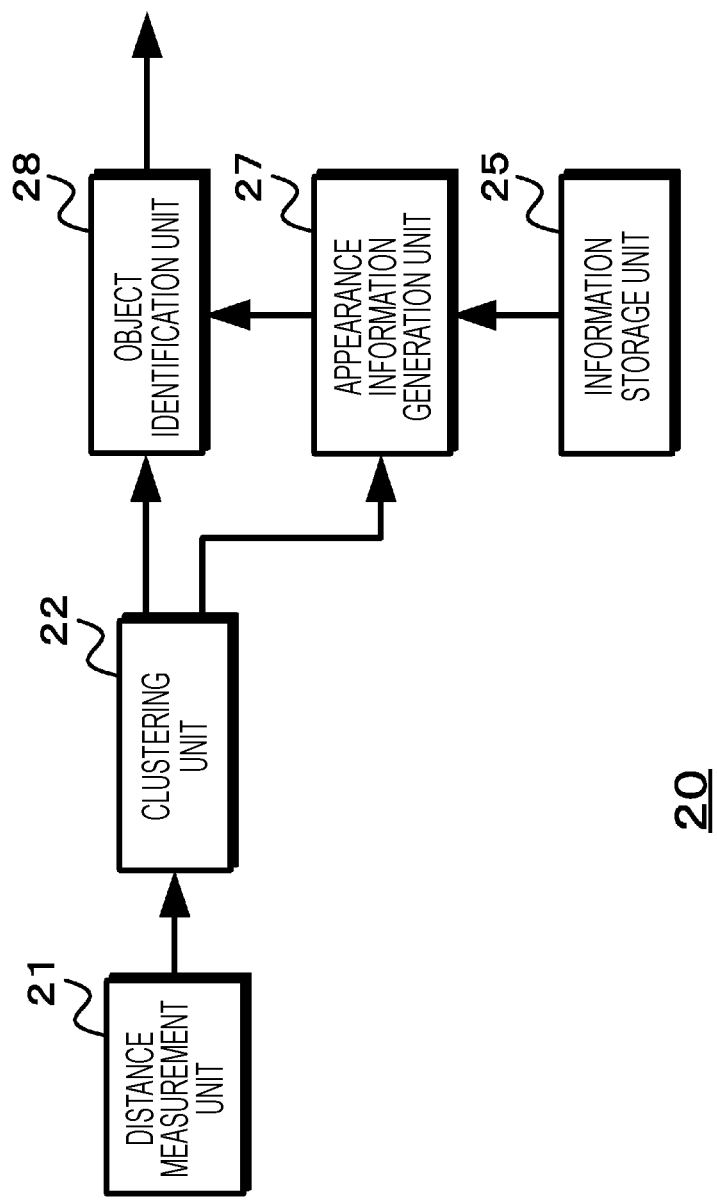
FIG. 14 illustrates a second configuration of the system.

FIG. 14 illustrates a second configuration of a system using an information processing apparatus of the present technology. A system 20 includes a distance measurement unit 21, a clustering unit 22, an information storage unit 25, an appearance information generation unit 27, and an object identification unit 28.

Figure 15:
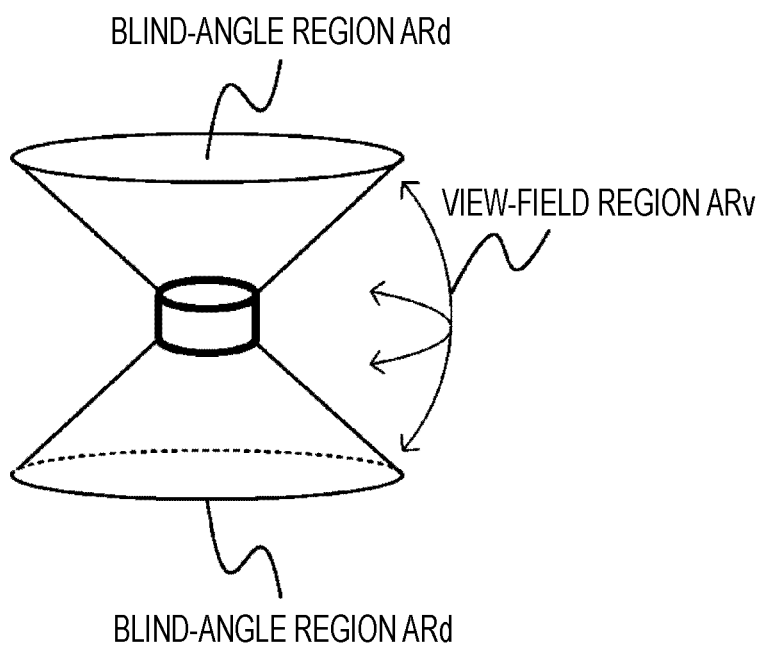
FIG. 15 illustrates a view-field region is a case where a three-dimensional LIDAR is used.

The distance measurement unit 21 is a sensor for measuring the distance to a target object. Examples of distance measurement unit 12 include, for example, a light detection or ranging and laser imaging detection and ranging (LIDAR) and the like capable of acquiring point group distance measurement data by measuring a distance to each position on a subject. The distance measurement unit 21 outputs the acquired point group distance measurement data to the clustering unit 22. Note that the view-field region ARv in a case where a three-dimensional LIDAR is used as the distance measurement unit 21 corresponds to a region sandwiched between two cones as illustrated in FIG. 15, and regions of the two cones corresponds to a blind-angle region ARd.

The clustering unit 22 clusters the point group distance measurement data, and classifies the point group distance measurement data into clusters on the basis of the distance. The clustering unit 22 outputs the classified point group clusters to the object identification unit 28. Furthermore, the clustering unit 22 outputs the position information of the point group clusters representing the target object to the appearance information generation unit 27.

The information storage unit 25 stores parameter information related to acquisition of object information representing the target object, for example, sensor parameters indicating, for example, the position and posture of the distance measurement unit 21 and the view-field region of the distance measurement unit 21. Furthermore, the information storage unit 25 stores object model information representing a learned object model.

The appearance information generation unit 27 generates appearance information for each object model on the basis of the three-dimensional position of the target object estimated by the clustering unit 22 and parameter information and object model information stored in the information storage unit 25. The appearance information indicates how the object model is seen from the distance measurement unit 21.

The appearance information generation unit 27 uses the position information of the point group cluster indicating the target object indicating the target object detected by the clustering unit 22 and the parameter information related to the acquisition of the object information representing the target object to generate appearance information for each object model. The appearance information represents the appearance of the object model at the position of the target object from the information acquisition position where the object information has been acquired. The appearance information generation unit 27 sets the part of the object model that overlaps the view-field region of the distance measurement unit 21 as the appearance of the object model. The distance measurement unit 21 acquires object information. Furthermore, the appearance information generation unit 27 determines the part of the object model that overlaps the view-field region on the basis of the parameter information.

The object identification unit 28 compares the appearance information for each object model generated by the appearance information generation unit 17 with the point group cluster representing the target object classified by the clustering unit 22. The object identification unit 28 identifies the object model corresponding to appearance information that matches the point group cluster representing the target object as the target object, and outputs an object identification result.

<5. Operation of Second Configuration>

Next, the operation of the second configuration of the system will be described. The appearance information generation unit 27 places the distance measurement unit 21 and an object model on the reference plane on the basis of the position information of the detected target object and the position and posture of the distance measurement unit 21. For example, the object model is placed at the position of the target object so as to be perpendicular to the reference plane and to face the distance measurement unit 21. In this case, any coordinate system may be used as long as the coordinate systems are unified. Note that the distance measurement unit 21 and the object model OBm are required to be placed with reference to the coordinate system of the reference plane in a manner similar to that in the first configuration.

Furthermore, the appearance information generation unit 27 determines a three-dimensional figure representing the position and posture of the distance measurement unit 21 and the view-field region of the distance measurement unit 21, places the three-dimensional figure on the view-field region of the distance measurement unit 21 placed on the reference plane and the reference plane, and generates appearance information from the object model on the basis of the overlap between the object model in the posture in accordance with the positional relation between the distance measurement unit 21 and the target object and the view-field region of the distance measurement unit 21.

Figure 16:
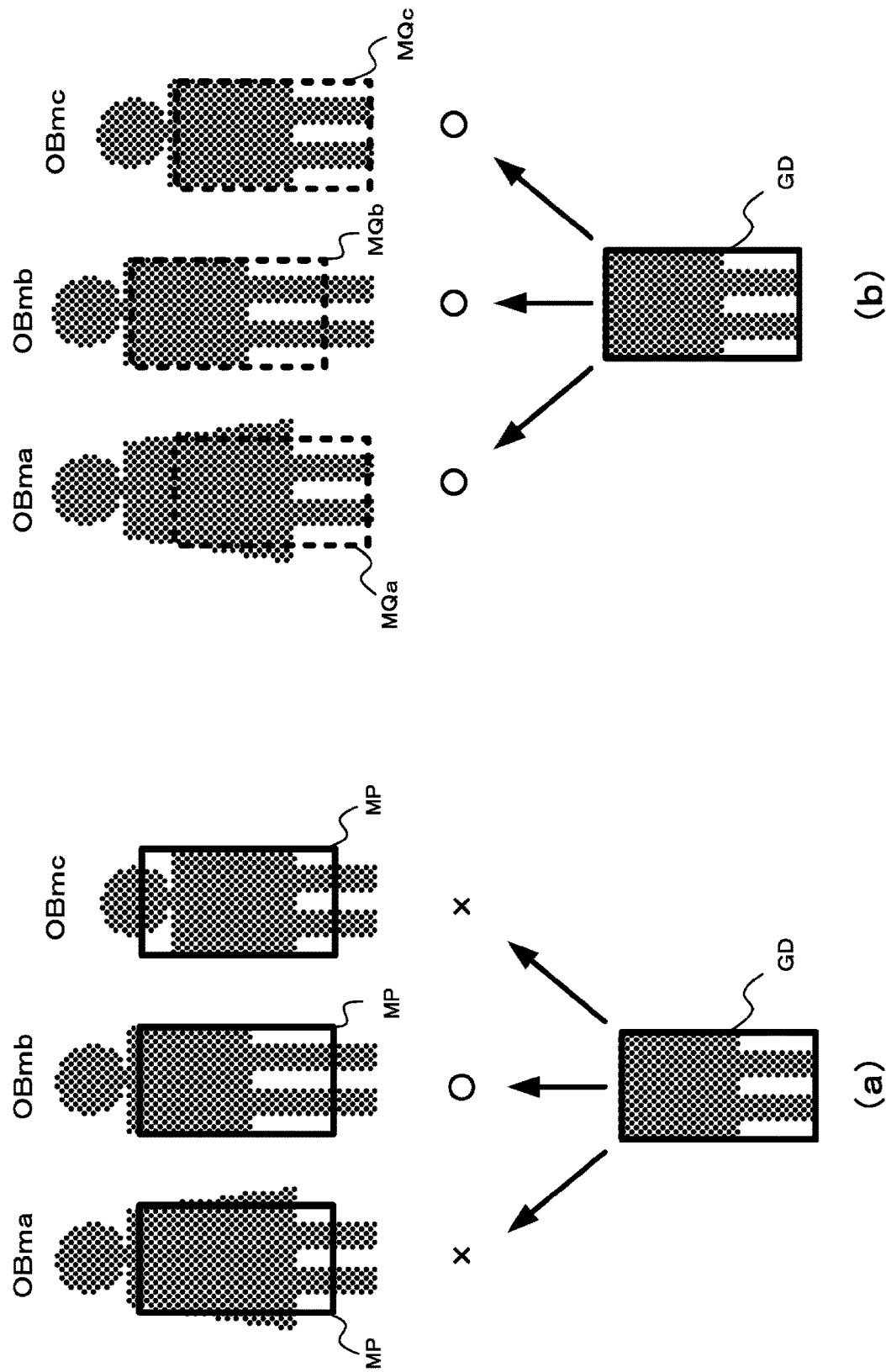
FIG. 16 illustrates appearance information obtained by the operation of the second configuration.

FIG. 16 illustrates appearance information obtained by the operation of the second configuration. According to the second configuration of the present, technology, as illustrated in (a) of FIG. 16, for example, point group distance data contained in the region MT is generated as the appearance information for the object model OBma. Similarly, point group distance data contained in the region MP is generated as appearance information also for the object models OBmb and OBmc. For this reason, the appearance information differs for each object model. Consequently, the object identification unit 28 can recognize the fact that the detected object is the object model OBmb by comparing the point group cluster of the object that has been detected by the clustering unit 22 with the appearance information. Note that (b) of FIG. 16 illustrates a case where a traditional technique is used. Regions indicated by broken lines in the object models OBma, OBmb, and OBmc are analogous to the point group cluster representing the detected object. For this reason, the case where the detected object is determined as the object model OBma or OBmc occurs, and highly precise identification processing as in the present technology cannot be performed.

According to the second configuration of the present technology, even if acquired information is the point group distance data, robustness is secured against the parting of a part of the target object, and an object can be identified with high precision in a manner similar to that in a case of acquiring a captured image. Furthermore, since the appearance of the object model from the distance measurement unit is considered, misidentification of an object that looks similar as a target object can be reduced. Furthermore, an object can be identified in consideration of reduction and size of a data amount of learning data. Moreover, since the point group distance data is used, the system configuration can be simplified as compared with that in the case where a captured image is used.

<6. Other Configurations and Operations of System>

By the way, although a case where change in posture of a sensor unit for acquiring object, information is in a pitch direction and yaw direction in the above-described system has been described, the sensor unit may change in a roll direction. Then, in other operations of a system, a case where the sensor unit changes in the roll direction will be described.

FIG. 17 illustrates a case where a sensor unit is provided downward with respect to an unmanned flying object. In a case where a sensor unit (e.g., imaging unit 41) provided on an unmanned flying object 40 images a ground surface from the sky, the unmanned flying object can move in a vertical direction (also referred to as throttle), anteroposterior direction (also referred to as elevator), right-and-left direction (also referred to as aileron), and rotational direction (also referred to as rudder). Consequently, in a case where the unmanned flying object moves in the rotational direction, the object information acquired by the imaging unit exhibits change in a roll direction. In a case of such a system, appearance information is generated in consideration of change in the rotational direction of the sensor unit.

Figure 18:
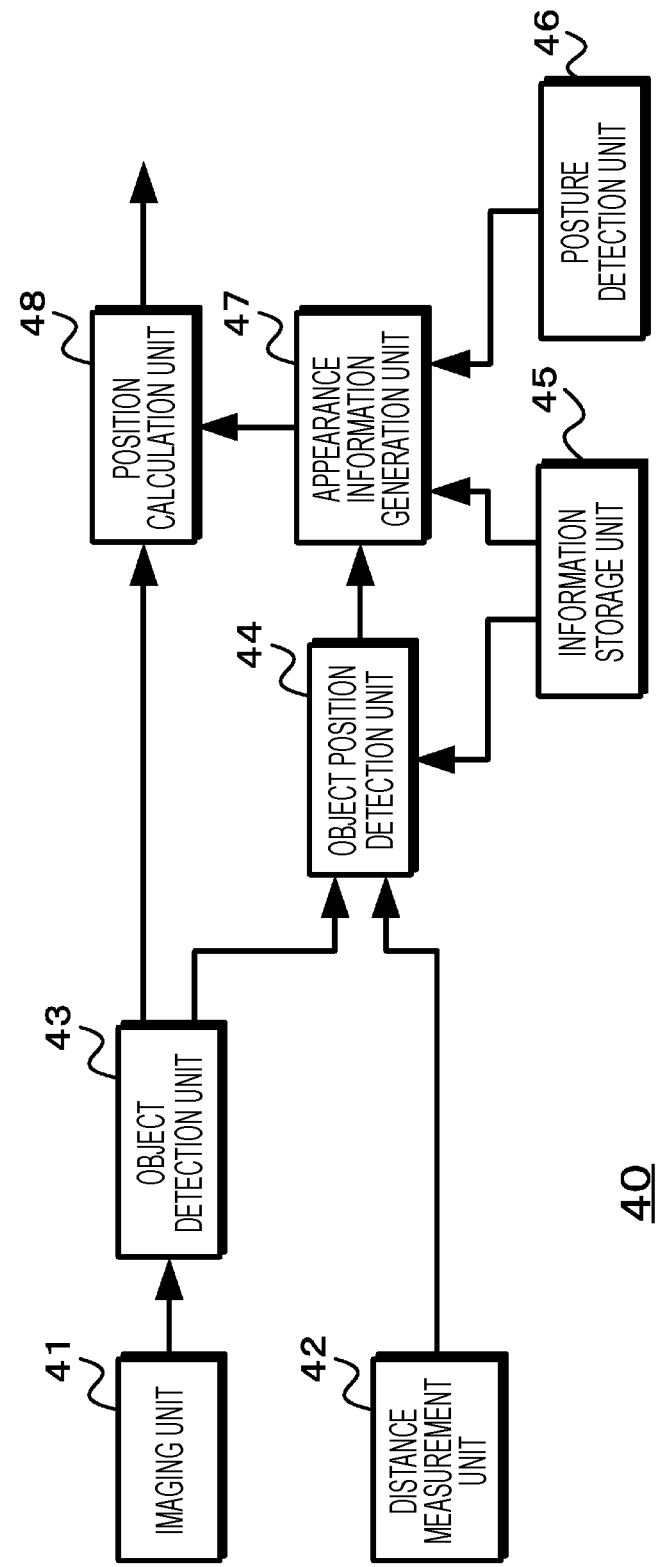
FIG. 18 illustrates a configuration in a case where the system is applied to the unmanned flying object.

FIG. 18 illustrates a configuration in a case where the system is applied to an unmanned flying object. A conceptual diagram in a case of estimating a self-position on the basis of (e.g., ground pattern) is illustrated. The unmanned flying object 40 includes the imaging unit 41, a distance measurement unit 42, an object detection unit 43, an object position detection unit 44, an information storage unit 45, a posture detection unit 46, an appearance information generation unit 47, and a position calculation unit 43. Furthermore, the unmanned flying object 40 includes, for example, a flight control unit for controlling the unmanned flying object.

The imaging unit 41 acquires object information representing a target object. The object information indicates outside features that can be acquired by observing a target object from the outside as described above. Examples of the imaging unit 41 include a color camera, a monochrome camera, an infrared camera, and the like. A captured image of three primary colors can be obtained by the color camera. A monochrome captured image can be obtained by the monochrome camera. A temperature image indicating the temperature of a target object can be obtained by the infrared camera. Note that parameter information at the time when the imaging unit 41 acquires object information representing a target object, for example, a camera parameter such as the posture, sensor viewing angle, and focal length of the imaging unit 41 are stored in the information storage unit 45.

The distance measurement unit 42 is a sensor for measuring the distance to the ground. Examples of the distance measurement unit 42 include a stereo camera, a camera capable of acquiring a captured image and distance measurement information by using an image sensor including an image surface phase difference pixel, a time of flight (TOF)

sensor, a light detection and ranging, laser imaging detection and ranging (LIDAR), a radio detection and ranging (RADAR), and the like.

The object detection unit 43 detects a target object (e.g., ground pattern) on the basis of a captured image acquired by the imaging unit 41, and outputs the position of the detected target object in the image.

The object position detection unit 44 estimates the three-dimensional position of the target object on the basis of the position, in an image, of the target object detected by the object detection unit 43, the distance to the target object measured by the distance measurement unit 42, parameter information stored in the information storage unit 45, and the posture detected by the later-described posture detection unit 46.

The information storage unit 45 stores, for example, parameter information and object model information as described above. Furthermore, as described later, in a case where the position calculation unit 48 calculates the self-position of the unmanned flying object 40, the object model information contains information (object model position information) indicating the position of an object model for each object model.

The posture detection unit 46 includes, for example, a magnetic sensor and an inertial measurement unit (IMU) sensor, and detects the posture of the imaging unit 41 with respect to a reference surface (ground) on which the object model is placed. Note that, in a case where the imaging unit 41 is fixed in the unmanned flying object 40, the posture of the imaging unit 41 may be detected by using the posture of the unmanned flying object 40.

The appearance information generation unit 47 estimates how the object model looks to generate appearance information on the basis of the distance to a ground measured by the distance measurement unit 42, parameter information and object model information stored in the information storage unit 45, and the posture of the imaging unit 41.

Figure 19:
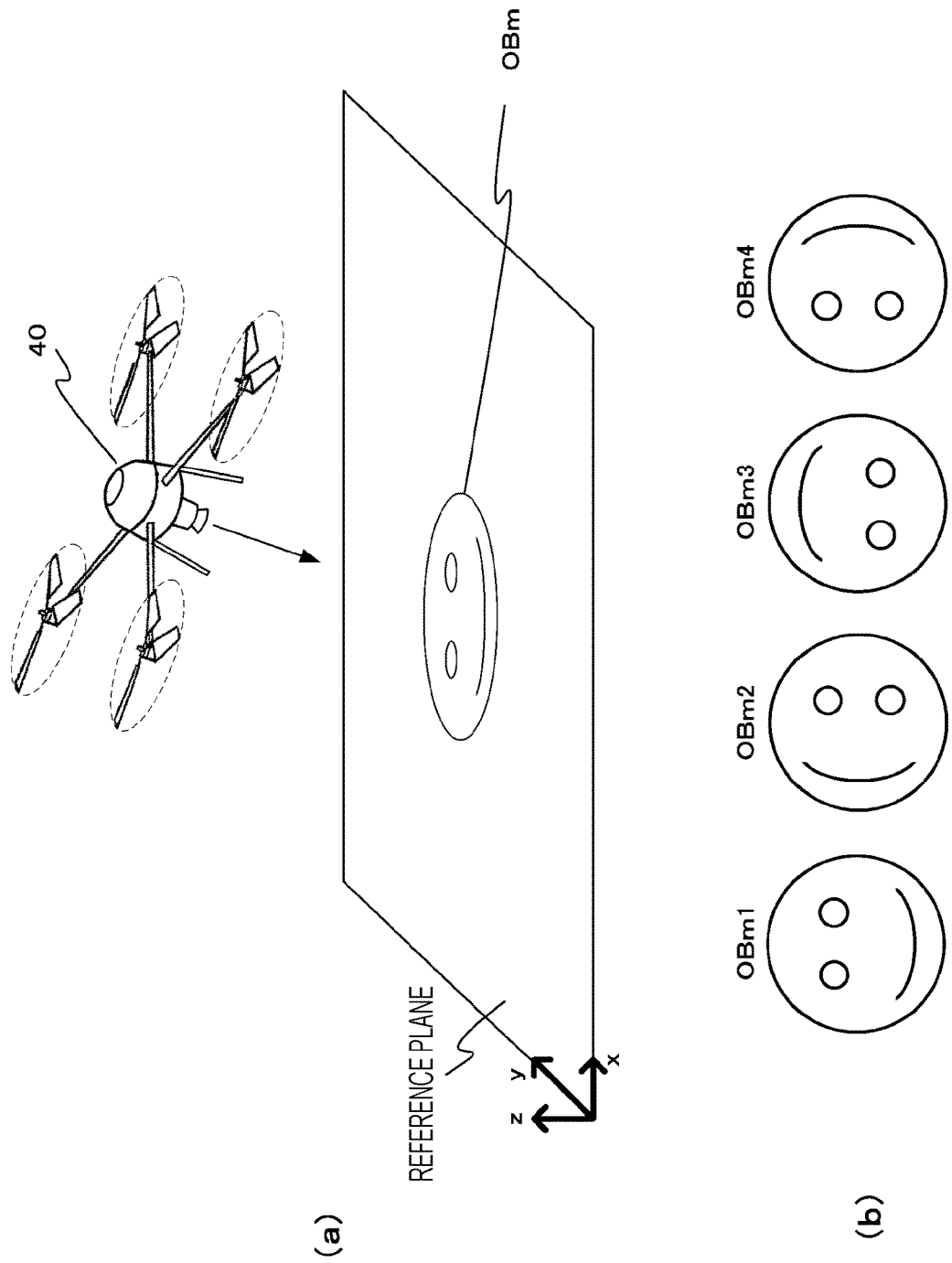
FIG. 19 illustrates a case where candidates of the object model are provided for a plurality of postures.

The appearance information generation unit 47 uses the position of the ground as a reference plane, and places the object model (ground pattern) such that the object model overlaps the reference plane. The posture with respect to the imaging unit 41 is arranged by selecting a candidate of the object model on the basis of the detection result from the posture detection unit 46. Note that in a case where the posture in the rotational direction is unknown since the posture detection unit 46 is not provided, candidates of the object model are provided for each of a plurality of postures as illustrated in FIG. 19. For example, in a case where the unmanned flying object 40 images the object model OBm as illustrated in (a) of FIG. 19, polarization models OBm1 to OBm4 in a plurality of rotational directions illustrated in (b) of FIG. 19 are provided.

Figure 20:
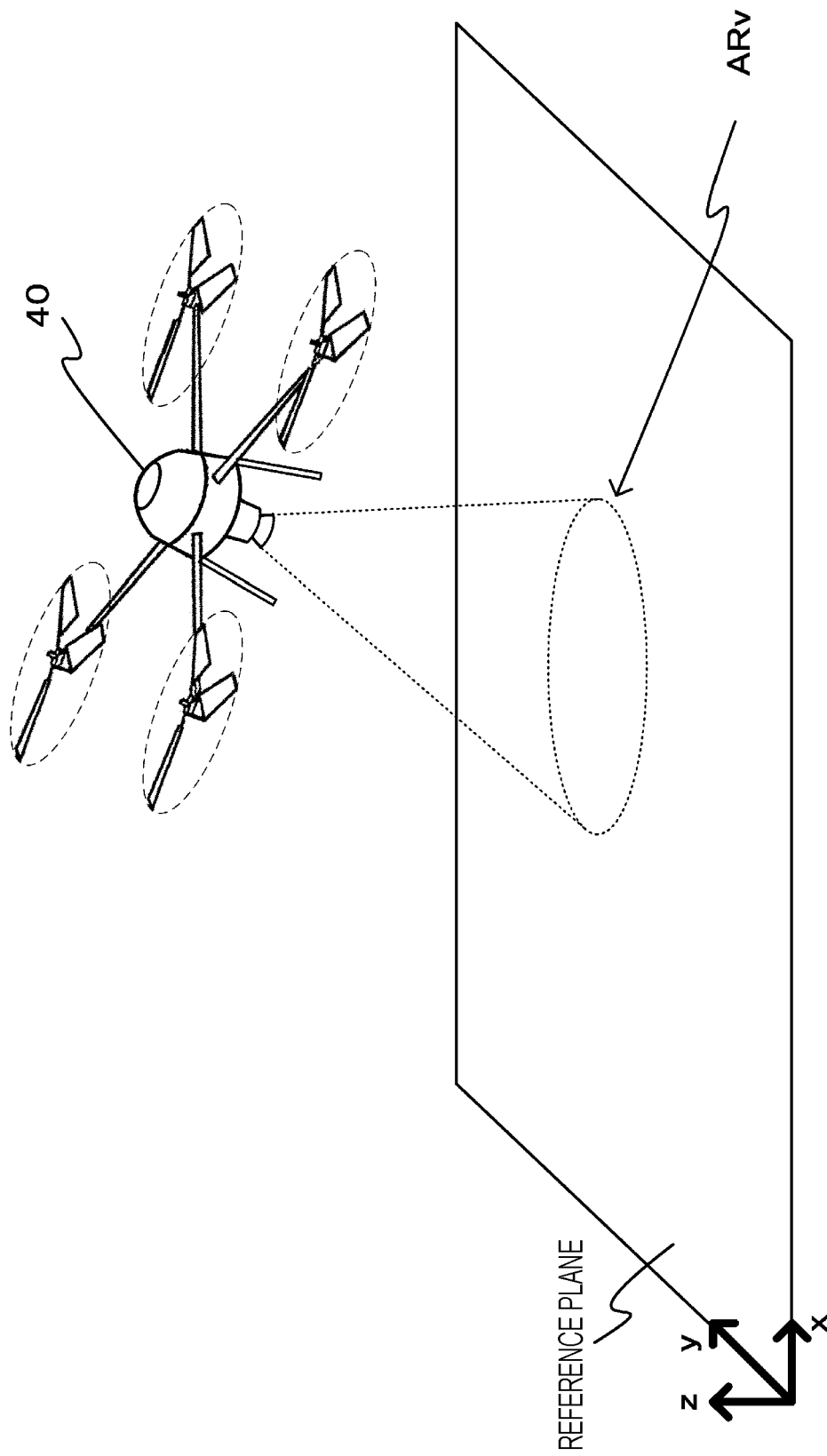
FIG. 20 illustrates a view-field region.

The appearance information generation unit 47 determines a view-field region of the imaging unit 41 in three-dimensional space on the basis of the posture of the imaging unit 41 and parameter information. Moreover, the appearance information generation unit 47 determines the posture of the imaging unit 41 with respect to the reference plane, and determines the view-field region on the reference plane of the imaging unit 41. Note that the object model is assumed to be on the reference plane, and thus the view-field region is a two-dimensional region at this point. FIG. 20 illustrates a view-field region.

Figure 21:
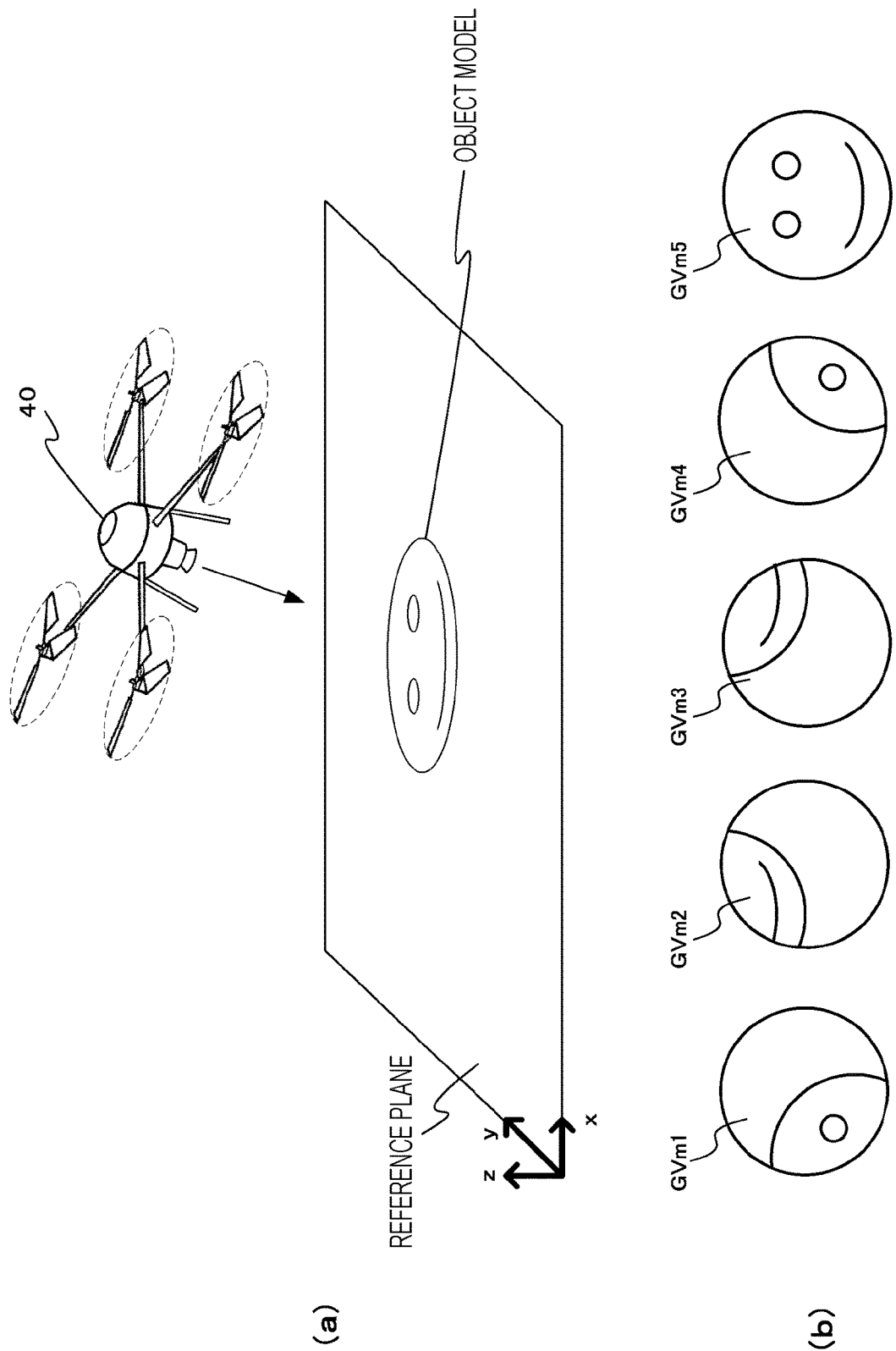
FIG. 21 illustrates appearance information.

The appearance information generation unit 47 generates appearance information from the overlap between the object model and the view-field region. The appearance information generation unit 47 determines the overlap between a plurality of placed object models and the view-field region, that is, the overlap between the two-dimensional regions, and defines the overlap as appearance information. FIG. 21 illustrates appearance information. For example, in a case where the imaging unit 41 images an object model from the sky as illustrated in (a) of FIG. 21, for example, pieces of appearance information GVm1 to GVm5 in (b) of FIG. 21 are generated.

The position calculation unit 48 compares the appearance information generated by the appearance information generation unit 47 with the target object detected by the object detection unit 43, and calculates the self-position of the unmanned flying object 40 by using the object model position information of an object model corresponding to the appearance information that matches the detected target object.

Figure 22:
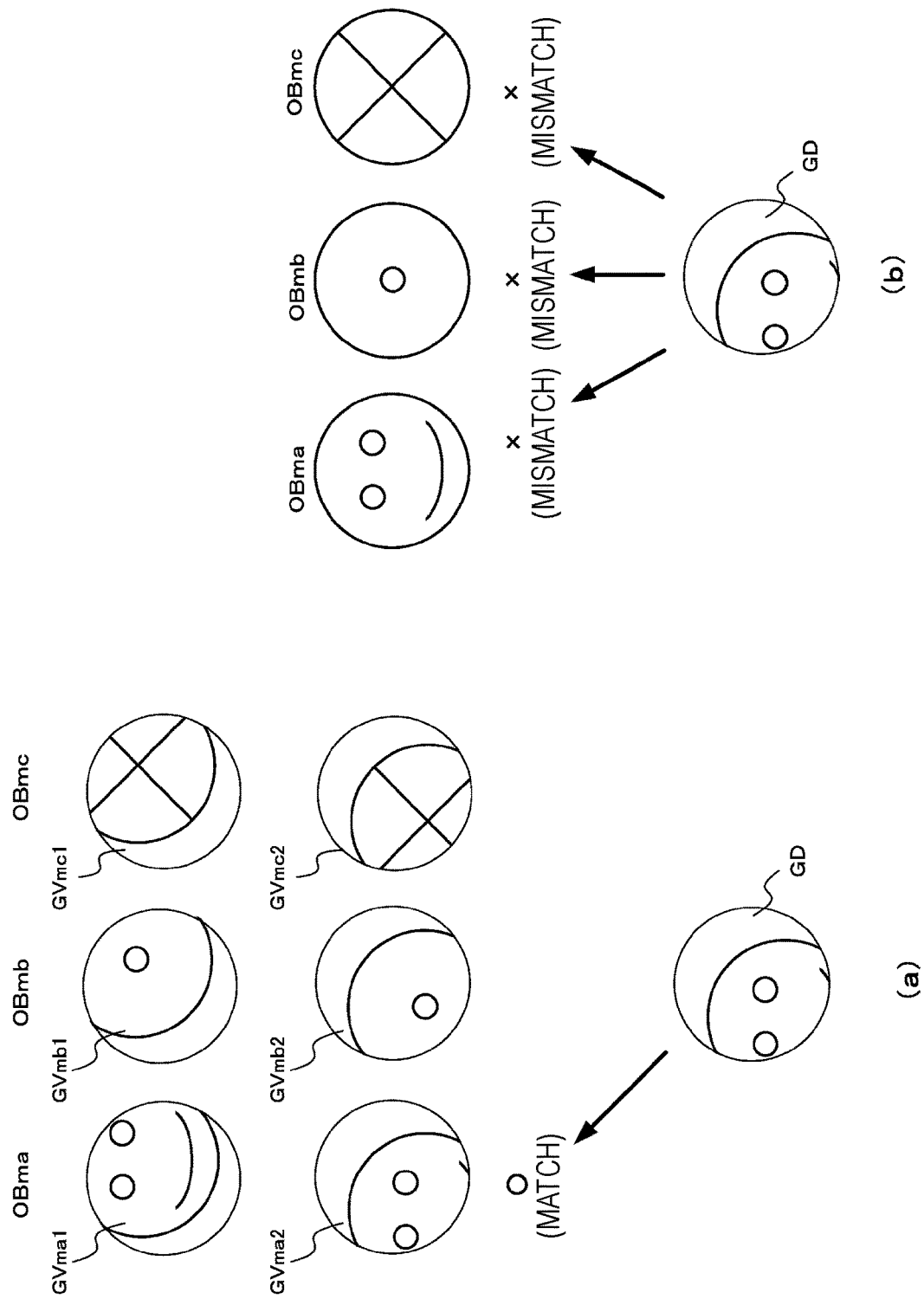
FIG. 22 illustrates appearance information of a plurality of object models.

FIG. 22 illustrates appearance information of a plurality of object models. In another operation of the present technology, as illustrated in (a) of FIG. 22, for example, pieces of object appearance information GVMa1 and GVma2 are generated for the object model OBma. Similarly, pieces of appearance information GVmb1, GVmb2, GVmc1, and GVmc2 are generated for the object models OBmb and OBmc. The position calculation unit 48 can correctly identify the fact that the detected target object is the object model OBma by comparing the input image GD with the appearance information. The input image GD represents the detected target object. Note that (b) of FIG. 22 illustrates a case where a traditional technique is used. Even if the images of the object models OBma, OBmb, and OBmc and the input image GD illustrating the detected object are compared, the images are different from each other. Thus, it cannot be determined that the detected object is the object model OBma.

Figure 23:
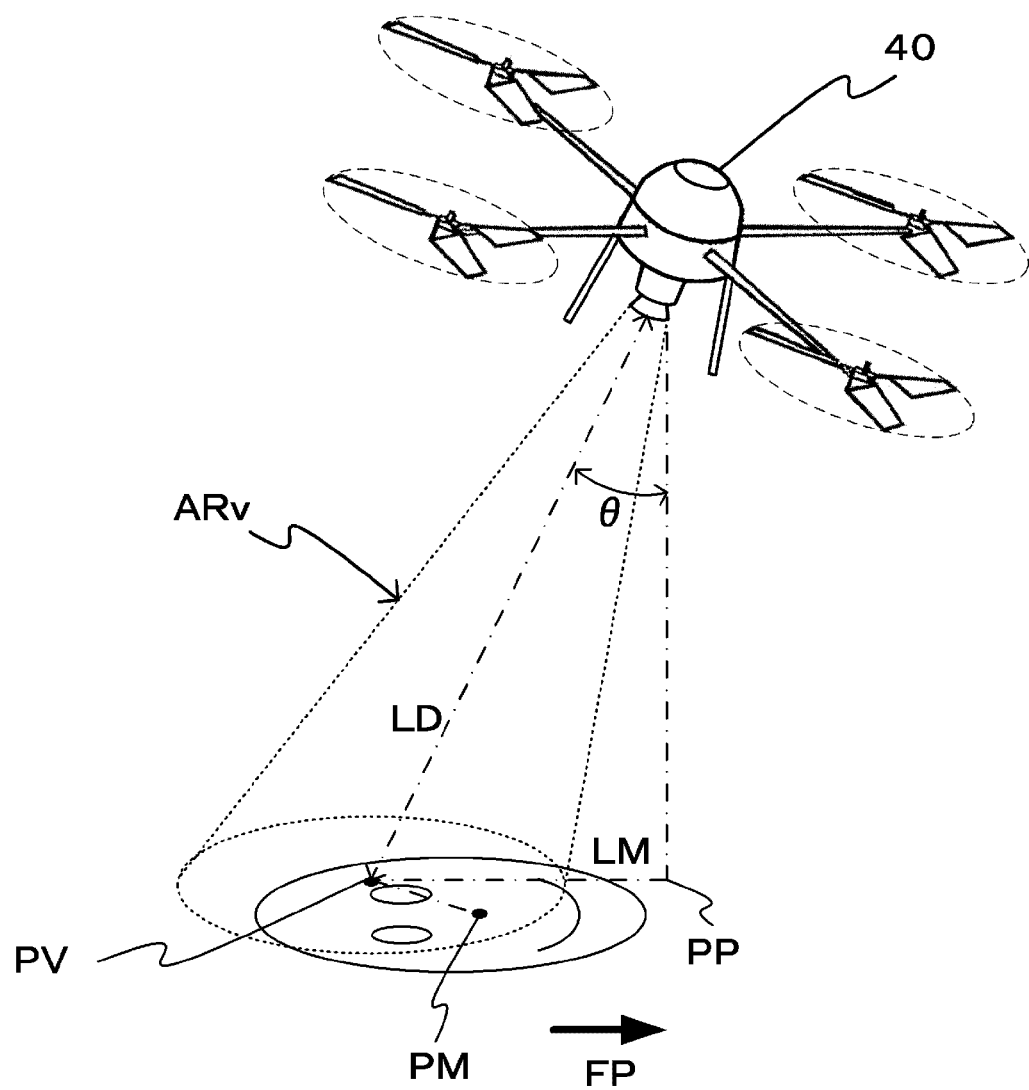
FIG. 23 illustrates the operation of calculating a self-position.

The position calculation unit 48 calculates the self-position of the unmanned flying object 40 on the basis of the object model position information of an object model that has been determined as a target object, the posture detected by the posture detection unit 46, a distance to the ground, and rotation information of appearance information that matches the input image GD. FIG. 23 illustrates the operation of calculating a self-position. For example, a direction FP of the unmanned flying object 40 with respect to an object model becomes clear to the position calculation unit 48 on the basis of appearance information (e.g., GVma2 in FIG. 22) that matches the input image GD. Furthermore, position difference between a central position PM of the object model and a central position PV of the appearance information becomes clear on the basis of the appearance information that matches the input image GD. The position calculation unit 48 calculates a distance LM from an intersection PP of a perpendicular line from the unmanned flying object 40 and a ground surface to a central position PV of the appearance information on the basis of the inclination θ detected by the posture detection unit 46 and a distance ID to the object. Furthermore, the position calculation unit 48 calculates position information of the intersection PP from the position information of the object model corresponding to the appearance information that matches the input image GD on the basis of the position difference information of the central position PV of the appearance information with respect to the central position PM of the object model and the position difference information indicating the position away from the central position PV to the direction FP by the distance LM, and defines the position information of the intersection PP as a self-position of the unmanned flying object 40.

Such processing enables easy self-position determination on the basis of, for example, a captured image of a ground, distance measurement information, and the posture of the unmanned flying object 40 even in a case where the unmanned flying object 40 does not have a function of receiving a distance measurement signal and where it takes time to calculate a self-position on the basis of a distance measurement signal.

Note that, although, in the above description of each operation, the object model OBm is assumed to be two-dimensional information having a size, the object model OBm may be three-dimensional information. In this case, the appearance information indicates a difference in a solid shape part. This enables correct distinction and identification of, for example, objects that are analogous as seen from the front but that have different irregularities as seen from the side surface. Consequently, for example, an object can be identified with higher precision than that in a case where the object model OBm is two-dimensional information. Note that, in a case where the object model OBm is two-dimensional information, appearance information is easily generated compared to the case where the object model OBm is three-dimensional information, and processing cost necessary for, for example, object identification and self-position determination can be reduced.

Furthermore, according to the technology of the present disclosure, the identification precision of a target object can be improved as described above. Consequently, for example, in a case where the present technology is used in any type of moving object such as an automobile, an electric automobile, a hybrid electric automobile, a motorcycle, a bicycle, a personal mobility, an airplane, a drone, a ship, a robot, a construction machine, and an agricultural machine (tractor), a surrounding situation can be checked with high precision during, for example, autonomous movement. Furthermore, for example, a highly precise monitoring system can be built by using the present technology.

The series of processing described in the specification can be executed by hardware, software, or a combined configuration of both. In a case where the processing is executed by software, a program, in which a processing sequence is recorded, is installed in a memory in a computer incorporated in dedicated hardware, and executed. Alternatively, the processing can be executed by installing the program in a general-purpose computer capable of executing various pieces of processing.

For example, the program can be preliminarily recorded on a hard disk, a solid state drive (SSD), or a read only memory (ROM) serving as a recording medium. Alternatively, the program can be temporarily or permanently stored (recorded) in a removable recording medium such as a flexible disc, a compact disc read only memory (CD-ROM), a Magneto optical (MO) disc, a digital versatile disc (DVD), a Blu-Ray Disc (BD (registered trademark)), a magnetic disk, and a semiconductor memory card. Such a removable recording medium can be provided as so-called package software.

Furthermore, the program may be transferred wirelessly or by wire from a download site to a computer via a network such as a local area network (LAN) and the internet, in addition to being installed from a removable recording medium to the computer. The computer can receive the program transferred in such a way, and install the program in a recording medium such as a built-in hard disk.

Note that the effects described in the specification are merely illustration and not limitation. Additional effects that are not described may be exhibited. Furthermore, the present technology should not be construed as being limited to the embodiment of the above-described technology. The embodiment of the technology discloses the present technology in the form of examples. It is obvious that those skilled in the art can make modifications and substitutions of the embodiment without departing from the spirit of the present technology. That is, the claims should be considered in order to determine the spirit of the present technology.

Furthermore, the information processing apparatus of the present technology can also have the configurations as follows.

(1) An information processing apparatus including an appearance information generation unit that generates appearance information representing appearance of an object model at a position of a target object from an information acquisition position where object information has been acquired on the basis of position information indicating a position of the target object and parameter information related to acquisition of the object information representing the target object.

(2) The information processing apparatus according to (1), in which the appearance information generation unit determines appearance of the object model on the basis of an overlap between a view-field region of a sensor unit that acquires the object information and the object model, and generates the appearance information.

(3) The information processing apparatus according to (2), in which the appearance information generation unit performs perspective projection conversion on a region where the view-field region and the object model overlap, and generates the appearance information.

(4) The information processing apparatus according to (2) or (3), in which the appearance information generation unit determines the view-field region on the basis of a position and posture of the sensor unit indicated by the parameter information and a sensor parameter.

(5) The information processing apparatus according to any one of (2) to (4), in which the appearance information generation unit excludes a region of a non-target object from the appearance information, the non-target object being contained in an overlapping region of the view-field region and the object model, and positioned in front of the target object.

(6) The information processing apparatus according to any one of (1) to (5), further including an object position detection unit that detects a position of the target object on the basis of a position, indicated by the object information, of the target object in a captured image of the target object, a distance from an acquisition position of the object information to the target object, and the parameter information.

(7) The information processing apparatus according to any one of (1) to (6), in which position information indicating a position of the target object indicates a position of a cluster that has been detected by clustering point group data in accordance with a distance measurement value, the point group data indicating the distance measurement value to the target object indicated by the object information.

(8) The information processing apparatus according to (1) to (7), further including an object identification unit that identifies the target object by using appearance information for each object model generated by the appearance information generation unit.

(9) The information processing apparatus according to (1), in which the appearance information generation unit generates the appearance information on the basis of a posture of the sensor unit with respect to a reference surface on which the object model is placed.

(10) The information processing apparatus according to (9), further including a position calculation unit that calculates a position of the sensor unit on the basis of position information of the object model, appearance information that matches the target object, and a posture of the sensor unit.

(11) The information processing apparatus according to (9) or (10), in which, in a case where a posture change amount in a roll direction of the sensor unit cannot be acquired, the object model is provided for each of postures different in the roll direction.

(12) The information processing apparatus according to any one of (9) to (11), in which the sensor unit is provided in a flying object.

INDUSTRIAL APPLICABILITY

According to the information processing apparatus, the information processing method, and the program of the technology, appearance information is generated on the basis of position information indicating the position of a target object and parameter information related to the acquisition of object information representing the target object. The appearance information represents the appearance of the object, model at the position of the target object from the information acquisition position where the object information has been acquired. Consequently, the identification precision of the target object can be improved by comparing the information of the target object acquired from the information acquisition position with the appearance information. If the technology is applied to a moving object mounted with various sensors, such as, for example, a robot, a vehicle, and a flying object, a surrounding situation, a self-position, and the like can be grasped with high precision.

REFERENCE SIGNS LIST 10, 20 System
11, 41 Imaging unit
12, 21, 42 Distance measurement unit
13, 43 Object detection unit
14, 44 Object position detection unit
15, 25, 45 Information storage unit
17, 27, 47 Appearance information generation unit
18, 28 Object identification unit
22 Clustering unit
31 Attachment tool
40 Unmanned flying object
46 Posture detection unit
48 Position calculation unit

The invention claimed is:

1. An information processing apparatus comprising:
an appearance information generation unit configured to generate appearance information representing appearance of an object model at a position of a target object from an information acquisition position where object information has been acquired on a basis of position information indicating a position of the target object and parameter information related to acquisition of the object information representing the target object; and
an object position detection unit configured to detect a position of the target object on a basis of a distance from an acquisition position of the object information to the target object,
wherein the appearance information generation unit and the object position detection unit are each implemented via at least one processor.

2. The information processing apparatus according to claim 1,
wherein the appearance information generation unit is further configured to
determine appearance of the object model on a basis of an overlap between a view-field region of a sensor unit that acquires the object information and the object model, and
generate the appearance information.

3. The information processing apparatus according to claim 2,
wherein the appearance information generation unit is further configured to
perform perspective projection conversion on a region where the view-field region and the object model overlap, and
generate the appearance information.

4. The information processing apparatus according to claim 2,
wherein the appearance information generation unit is further configured to determine the view-field region on a basis of a position and posture of the sensor unit indicated by the parameter information and a sensor parameter.

5. The information processing apparatus according to claim 2,
wherein the appearance information generation unit is further configured to exclude a region of a non-target object from the appearance information, the non-target object being contained in an overlapping region of the view-field region and the object model, and positioned in front of the target object.

6. The information processing apparatus according to claim 2,
wherein the appearance information generation unit is further configured to generate the appearance information on a basis of a posture of the sensor unit with respect to a reference surface on which the object model is placed.

7. The information processing apparatus according to claim 6, further comprising
a position calculation unit configured to calculate a position of the sensor unit on a basis of position information of the object model, appearance information that matches the target object, and a posture of the sensor unit,
wherein the position calculation unit is implemented via at least one processor.

8. The information processing apparatus according to claim 6,
wherein, in a case where a posture change amount in a roll direction of the sensor unit cannot be acquired, the object model is provided for each of postures different in the roll direction.

9. The information processing apparatus according to claim 6,
wherein the sensor unit is provided in a flying object.

10. The information processing apparatus according to claim 1,
wherein the object position detection unit is further configured to detect position of the target object on a basis of a position, indicated by the object information, of the target object in a captured image of the target object and the parameter information.

11. The information processing apparatus according to claim 1,
wherein position information indicating a position of the target object indicates a position of a cluster that has been detected by clustering point group data in accordance with a distance measurement value, the point group data indicating the distance measurement value to the target object indicated by the object information.

12. The information processing apparatus according to claim 1, further comprising
an object identification unit configured to identify the target object by using appearance information for each object model generated by the appearance information generation unit,
wherein the object identification unit is implemented via at least one processor.

13. An information processing method comprising:
generating appearance information representing appearance of an object model at a position of a target object from an information acquisition position where object information has been acquired on a basis of position information indicating a position of the target object and parameter information related to acquisition of the object information representing the target object; and
detecting a position of the target object on a basis of a distance from an acquisition position of the object information to the target object.

14. A non-transitory computer-readable medium having embodied thereon a program, which when executed by a computer causes the computer to execute an information processing method, the method comprising:
generating appearance information representing appearance of an object model at a position of a target object from an information acquisition position where object information has been acquired on a basis of position information indicating a position of the target object and parameter information related to acquisition of the object information representing the target object; and
detecting a position of the target object on a basis of a distance from an acquisition position of the object information to the target object.

* * * * *